US012608705B2

(12) United States Patent
Jung et al.

(10) Patent No.: US 12,608,705 B2
(45) Date of Patent: Apr. 21, 2026

(54) TRANSACTION METHOD AND DEVICE USING UWB COMMUNICATION

(71) Applicant: Samsung Electronics Co., Ltd., Gyeonggi-do (KR)

(72) Inventors: Sooyeon Jung, Gyeonggi-do (KR); Mingyu Lee, Gyeonggi-do (KR); Taeyoung Ha, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 109 days.

(21) Appl. No.: 17/838,993

(22) Filed: Jun. 13, 2022

(65) Prior Publication Data

US 2022/0398581 A1 Dec. 15, 2022

(30) Foreign Application Priority Data

Jun. 14, 2021 (KR) ........................ 10-2021-0076959

(51) Int. Cl.
*G06Q 20/40* (2012.01)

(52) U.S. Cl.
CPC ....... *G06Q 20/401* (2013.01); *G06Q 2220/00* (2013.01)

(58) Field of Classification Search
None
See application file for complete search history.

(56) References Cited

U.S. PATENT DOCUMENTS

| | | | | | |
|---|---|---|---|---|---|
| 8,312,660 | B1 * | 11/2012 | Fujisaki | ................. | F41A 17/08 455/457 |
| 9,514,589 | B2 * | 12/2016 | Raina | ....................... | G07C 9/15 |
| 9,600,808 | B1 * | 3/2017 | Gomez, Sr. | ............ | G06Q 20/00 |
| 10,546,291 | B2 * | 1/2020 | Kim | ...................... | G06Q 20/382 |
| 11,074,578 | B2 * | 7/2021 | Koganti | ............... | G06Q 20/322 |

(Continued)

FOREIGN PATENT DOCUMENTS

| | | | | | |
|---|---|---|---|---|---|
| BR | 102014004479 | A2 * | 11/2015 | ............... | A61B 3/10 |
| CA | 2715362 | A1 * | 3/2011 | ....... | G06F 17/30905 |

(Continued)

OTHER PUBLICATIONS

M. Rogobete, M. I. Mihailescu and E. Marin, "Ultra-Wideband Technology in Telematics Security—A short Survey," 2021 13th International Conference on Electronics, Computers and Artificial Intelligence (ECAI), Pitesti, Romania, 2021, pp. 1-6, https://ieeexplore. ieee.org/document/9515057?source=IQplus (Year: 2021).*

(Continued)

*Primary Examiner* — El Mehdi Oussir
(74) *Attorney, Agent, or Firm* — The Farrell Law Firm, P.C.

(57) ABSTRACT

A method is provided for operating an ultra-wide band (UWB) device, the method including transmitting, to a gate, a first message including a device identity (ID) for identifying the UWB device and a transaction ID for identifying a transaction of the UWB device, receiving, from the gate, a second message including a gate authentication cryptogram generated based on the device ID and the transaction ID, verifying the gate based on the gate authentication cryptogram, encrypting payment information for the transaction in response to the gate being verified, and transmitting, to the gate, a third message including the encrypted payment information.

12 Claims, 15 Drawing Sheets

20

First UWB device                    Second UWB device

(56) References Cited

U.S. PATENT DOCUMENTS

| | | | | |
|---|---|---|---|---|
| 11,188,903 | B2 * | 11/2021 | Tierney | G06Q 20/385 |
| 11,210,665 | B2 * | 12/2021 | Tierney | G06Q 20/40 |
| 11,763,311 | B2 * | 9/2023 | Wagner | H04L 63/0861 |
| | | | | 726/7 |
| 12,041,169 | B2 * | 7/2024 | Jung | H04L 9/14 |
| 2006/0117177 | A1 * | 6/2006 | Buer | H04L 9/0897 |
| | | | | 713/155 |
| 2009/0125429 | A1 * | 5/2009 | Takayama | G06Q 20/327 |
| | | | | 705/35 |
| 2012/0290336 | A1 * | 11/2012 | Rosenblatt | H04B 5/00 |
| | | | | 705/5 |
| 2012/0330784 | A1 * | 12/2012 | Nahidipour | G06Q 20/20 |
| | | | | 705/26.1 |
| 2013/0080289 | A1 * | 3/2013 | Roy | G06Q 20/322 |
| | | | | 705/26.8 |
| 2013/0239086 | A1 * | 9/2013 | Brendza | G06F 8/38 |
| | | | | 717/109 |
| 2014/0229387 | A1 * | 8/2014 | Chow | G06Q 20/3829 |
| | | | | 705/71 |
| 2016/0012465 | A1 * | 1/2016 | Sharp | G06Q 20/321 |
| | | | | 705/14.17 |
| 2016/0253652 | A1 * | 9/2016 | Je | G06Q 20/38215 |
| | | | | 705/39 |
| 2016/0328714 | A1 | 11/2016 | Lee et al. | |
| 2016/0358137 | A1 * | 12/2016 | Ryu | G06Q 20/382 |
| 2018/0349653 | A1 | 12/2018 | Al-kadi et al. | |
| 2018/0349901 | A1 * | 12/2018 | Chen | G06Q 20/3265 |
| 2019/0098018 | A1 * | 3/2019 | Lerch | G07C 9/29 |
| 2020/0014526 | A1 | 1/2020 | Hammerschmidt et al. | |
| 2020/0052905 | A1 | 2/2020 | Athias et al. | |
| 2020/0074434 | A1 * | 3/2020 | Chen | G06Q 20/24 |
| 2020/0082370 | A1 | 3/2020 | Yang et al. | |
| 2020/0082396 | A1 * | 3/2020 | Chow | G06Q 20/1085 |
| 2020/0311710 | A1 * | 10/2020 | Laracey | G06Q 30/0253 |
| 2020/0351247 | A1 | 11/2020 | Song et al. | |
| 2020/0389788 | A1 * | 12/2020 | Smeets | H04W 12/65 |
| 2020/0402049 | A1 * | 12/2020 | Pi Farias | G06Q 20/208 |
| 2021/0044976 | A1 * | 2/2021 | Avetisov | H04W 12/08 |
| 2021/0233046 | A1 * | 7/2021 | Faith | G06Q 20/10 |
| 2021/0312424 | A1 * | 10/2021 | Lee | G06Q 20/3825 |
| 2022/0084018 | A1 * | 3/2022 | Mokhasi | G06Q 20/354 |
| 2022/0085990 | A1 * | 3/2022 | Liu | H04L 9/0861 |
| 2022/0309502 | A1 * | 9/2022 | Ortiz | G06Q 20/204 |
| 2023/0142886 | A1 * | 5/2023 | Nelson | G06Q 20/3278 |
| | | | | 463/25 |
| 2023/0199503 | A1 * | 6/2023 | Saxena | H04W 12/0471 |
| | | | | 726/2 |
| 2024/0021023 | A1 * | 1/2024 | Jain | G06Q 10/02 |
| 2024/0056424 | A1 * | 2/2024 | Venkatesan | H04L 9/0822 |
| 2024/0311828 | A1 * | 9/2024 | Biswas | G06Q 20/322 |

FOREIGN PATENT DOCUMENTS

| | | | | | |
|---|---|---|---|---|---|
| CA | 2965445 | C | * | 3/2023 | G06Q 20/3227 |
| CA | 3209957 | A1 | * | 4/2023 | G07C 9/00571 |
| CN | 1246941 | A | * | 3/2000 | G06Q 20/04 |
| CN | 1774942 | A | * | 5/2006 | E03C 1/0412 |
| CN | 100520688 | C | * | 7/2009 | G06F 3/0317 |
| CN | 101836215 | A | * | 9/2010 | G06Q 30/04 |
| CN | 1809833 | B | * | 8/2015 | G06K 17/00 |
| CN | 205563725 | U | * | 9/2016 | |
| CN | 107005563 | A | * | 8/2017 | G01D 4/004 |
| CN | 108335090 | A | * | 7/2018 | |
| CN | 108537536 | A | * | 9/2018 | |
| CN | 207813243 | U | * | 9/2018 | |
| CN | 108805641 | A | * | 11/2018 | |
| CN | 110689644 | A | * | 1/2020 | |
| CN | 111553667 | A | * | 8/2020 | G06Q 40/04 |
| CN | 112083678 | A | * | 12/2020 | |
| CN | 112116503 | A | * | 12/2020 | |
| CN | 112508575 | B | * | 5/2021 | |
| CN | 106803175 | B | * | 7/2021 | G06Q 20/36 |
| CN | 215450449 | U | * | 1/2022 | |
| CN | 114241652 | A | * | 3/2022 | |
| CN | 107209889 | B | * | 5/2022 | H04L 9/3215 |
| CN | 114862395 | A | * | 8/2022 | |
| CN | 115409504 | A | * | 11/2022 | |
| CN | 115867976 | A | * | 3/2023 | G06Q 10/10 |
| DE | 102012011103 | B4 | * | 7/2017 | G06Q 20/045 |
| DE | 112020001131 | T5 | * | 1/2022 | G01S 17/10 |
| EP | 3886389 | A1 | * | 9/2021 | G01S 1/3765 |
| FR | 2909508 | A1 | * | 6/2008 | H04M 1/72544 |
| FR | 3120149 | A1 | * | 8/2022 | H04L 63/0853 |
| IT | 102021000003896 | B1 | * | 2/2021 | |
| JP | 2016186760 | A | * | 10/2016 | |
| JP | 2018-206355 | | | 12/2018 | |
| JP | 2022060107 | A | * | 4/2022 | |
| KR | 100591907 | B1 | * | 10/2003 | G06F 21/6245 |
| KR | 20070040182 | A | * | 10/2005 | |
| KR | 20130042193 | A | * | 10/2011 | |
| KR | 10-2017-0080382 | | | 7/2017 | |
| KR | 20220161044 | A | * | 5/2021 | |
| KR | 20240019137 | A | * | 6/2021 | |
| KR | 102625346 | B1 | * | 1/2024 | G06Q 20/325 |
| WO | WO-2005034424 | A1 | * | 4/2005 | H04L 63/0823 |
| WO | WO-2011149558 | A2 | * | 12/2011 | G06Q 10/067 |
| WO | WO-2015066191 | A1 | * | 5/2015 | G06Q 20/327 |
| WO | WO-2017223525 | A1 | * | 12/2017 | H04L 9/3226 |
| WO | WO-2020081044 | A1 | * | 4/2020 | G06F 21/6245 |
| WO | WO-2020251529 | A1 | * | 12/2020 | G06Q 20/202 |
| WO | WO 2021/066367 | | | 4/2021 | |
| WO | WO-2021138024 | A1 | * | 7/2021 | G06Q 20/02 |
| WO | WO-2021157911 | A1 | * | 8/2021 | |
| WO | WO-2021239966 | A1 | * | 12/2021 | G06Q 20/3274 |
| WO | WO-2022173245 | A2 | * | 8/2022 | G06F 7/588 |
| WO | WO-2023016563 | A1 | * | 2/2023 | |
| WO | WO-2024026135 | A1 | * | 2/2024 | G06Q 20/20 |

OTHER PUBLICATIONS

J. Kang and D. Nyang, "A Privacy-Preserving Mobile Payment System for Mass Transit," in IEEE Transactions on Intelligent Transportation Systems, vol. 18, No. 8, pp. 2192-2205.https://ieeexplore.IEEE.org/document/7805316?source=IQplus (Year: 2017).*

J. Kaur, A. Kumar and M. Bansal, "Lightweight cipher algorithms for smart cards security: A survey and open challenges," 2017 4th International Conference on Signal Processing, Computing and Control (ISPCC), Solan, India, 2017, pp. 541-546. https:// ieeexplore.IEEE.org/document/8269738?source=IQplus (Year: 2017).*

R. Zhu, X. He, J. Xie, Z. Zhang and P. Wang, "An Improved RFID-based Authentication Protocol for Rail Transit," 2020 IEEE 14th International Conference on Big Data Science and Engineering (BigDataSE), Guangzhou, China, 2020. https://ieeexplore.IEEE. org/ document/9343357?source=IQplus (Year: 2020).*

IEEE Standard for Local and metropolitan area networks—Part 15.4: Low-Rate Wireless Personal Area Networks (LR-WPANs), in IEEE Std 802.15.4-2011. https://ieeexplore.ieee.org/document/6012487?source=IQplus (Year: 2011).*

International Search Report dated Sep. 29, 2022 issued in counterpart application No. PCT/KR2022/008321, 6 pages.

European Search Report dated Sep. 30, 2024 issued in counterpart application No. 22825253.2-1218, 8 pages.

Ashima Gupta et al., "A Survey on Ultra Wide Band Medium Access Control Schemes", Computer Networks, vol. 51, Issue 11, Aug. 8, 2007, 7 pages.

Korean Office Action dated Jul. 11, 2025 issued in counterpart application No. 10-2021-0076959, 13 pages.

* cited by examiner

1530

1630

TRANSACTION METHOD AND DEVICE USING UWB COMMUNICATION

CROSS-REFERENCE TO RELATED APPLICATION(S)

This application is based on and claims priority under 35 U.S.C. § 119 to Korean Patent Application No. 10-2021-0076959, filed on Jun. 14, 2021, in the Korean Intellectual Property Office, the entire disclosure of which is incorporated herein by reference.

BACKGROUND

1. Field

The disclosure relates generally to ultra-wide band (UWB) communication and, more specifically, to a transaction method and device using UWB communication.

2. Description of Related Art

The Internet is evolving from the human-centered connection network by which humans create and consume information to the Internet of things (IoT) network by which information is communicated and processed between things or other distributed components. Another arising technology is the Internet of everything (IoE), which is a combination of the big data processing technology and the IoT technology through, e.g., a connection with a cloud server. Implementing the IoT requires technical elements, such as sensing technology, a wired/wireless communication and network infrastructure, service interface and security technologies. Recent ongoing research for thing-to-thing connection focuses on techniques for sensor networking, machine-to-machine (M2M), or machine-type communication (MTC).

The IoT environment may offer intelligent Internet Technology (IT) services that collect and analyze the data generated by the things connected with one another to create new value in human life. The IoT may have various applications, such as smart home, smart building, smart city, smart car or car, smart grid, health-care, or smart appliance industry, or state-of-art medical services, through conversion or integration of conventional information technology techniques and various industries.

As wireless communication systems evolve to provide various services, a need arises for a method for effectively providing such services. For example, it is possible to use a ranging technique for measuring the distance between electronic devices using UWB. UWB is a wireless communication technology that uses a very wide frequency band of several GHz or more in a baseband without using a wireless carrier.

SUMMARY

The disclosure has been made to address at least the above-mentioned problems and/or disadvantages and to provide at least the advantages described below. The disclosure provides a method for reducing a protocol operation time by minimizing application protocol data unit (APDU) exchange in a UWB-based gate system.

The disclosure also provides a method for pre-authenticating a gate using a preset security key and proceeding with a payment procedure with the gate only when authentication is successful.

The disclosure also provides a method for exchanging prior data when generating a UWB channel before the first APDU exchange to minimize APDU exchange.

The device according to the disclosure may reduce a protocol operation time by minimizing APDU exchange in a UWB-based gate system.

According to an embodiment, a method is provided for operating a UWB device that includes transmitting, to a gate, a first message including a device identity (ID) for identifying the UWB device and a transaction ID for identifying a transaction of the UWB device, receiving, from the gate, a second message including a gate authentication cryptogram generated based on the device ID and the transaction ID, and verifying the gate based on the gate authentication cryptogram, encrypting payment information about the transaction when the gate is verified, and transmitting, to the gate, a third message including the encrypted payment information.

According to an embodiment, a method is provided for operating a gate configured to perform UWB communication may include receiving, from a UWB device, a first message including a device ID for identifying the UWB device and a transaction ID for identifying a transaction of the UWB device, generating a gate authentication cryptogram based on the device ID and the transaction ID and transmitting a second message including the generated gate authentication cryptogram to the UWB device, and receiving, from the UWB device, a third message including encrypted payment information about the transaction when a gate is verified by the UWB device based on the gate authentication cryptogram.

According to an embodiment, a UWB device is provided that includes a transceiver and a controller configured to control the transceiver to transmit, to a gate, a first message including a device ID for identifying the UWB device and a transaction ID for identifying a transaction of the UWB device, control the transceiver to receive, from the gate, a second message including a gate authentication cryptogram generated based on the device ID and the transaction ID, verify the gate based on the gate authentication cryptogram, encrypt payment information about the transaction when the gate is verified, and control the transceiver to transmit, to the gate, a third message including the encrypted payment information.

According to an embodiment, a gate configured to perform UWB communication may include a transceiver and a controller configured to control the transceiver to receive, from a UWB device, a first message including a device ID for identifying the UWB device and a transaction ID for identifying a transaction of the UWB device, generate a gate authentication cryptogram based on the device ID and the transaction ID, control the transceiver to transmit a second message including the generated gate authentication cryptogram to the UWB device, and control the transceiver to receive, from the UWB device, a third message including encrypted payment information about the transaction when a gate is verified by the UWB device based on the gate authentication cryptogram.

BRIEF DESCRIPTION OF THE DRAWINGS

A more complete appreciation of the present disclosure and many of the attendant embodiment thereof will be readily obtained as the same becomes better understood by reference to the following detailed description when considered in connection with the accompanying drawings, wherein.

DETAILED DESCRIPTION

Figure 1:
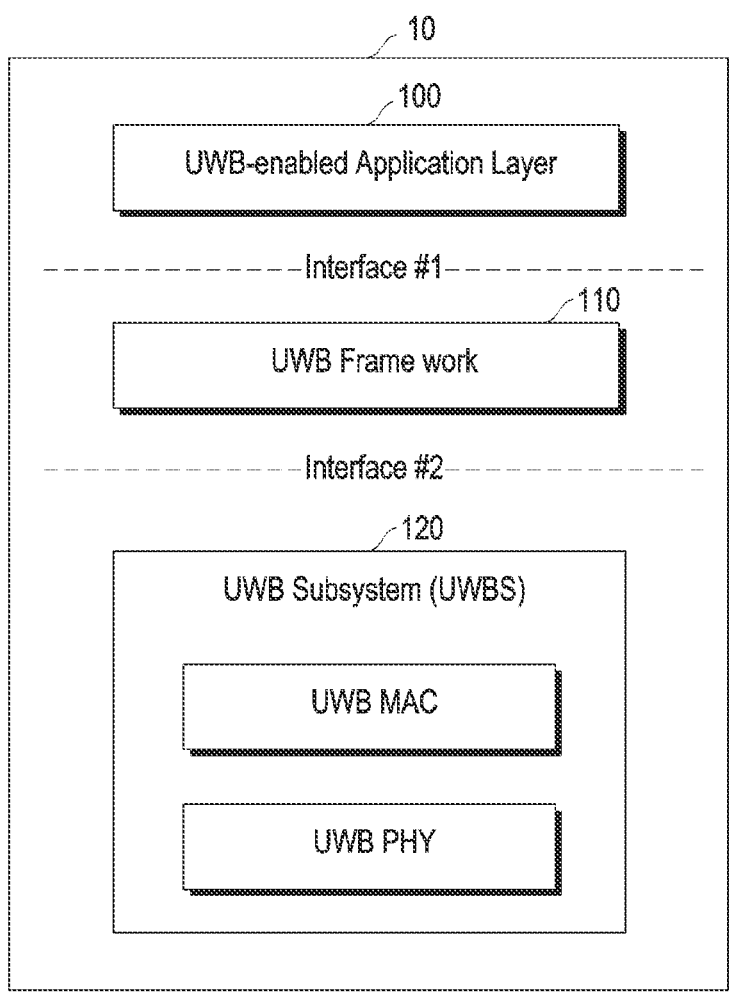
FIG. 1 illustrates an example architecture of a UWB device.

Hereinafter, embodiments of the disclosure are described in detail with reference to the accompanying drawings. Descriptions of well-known functions and constructions are omitted for the sake of clarity and conciseness.

In the disclosure, embodiments are described in the drawings and a related detailed description is set forth, but this is not intended to limit the embodiments of the disclosure. Some elements may be exaggerated or schematically shown. The size of each element does not necessarily reflect the actual size of the element. The same reference numeral is used to refer to the same element throughout the drawings.

It should be appreciated that the blocks in each flowchart and combinations of the flowcharts may be performed by computer program instructions. Since the computer program instructions may be equipped in a processor of a general-use computer, a special-use computer or other programmable data processing devices, the instructions executed through a processor of a computer or other programmable data processing devices generate means for performing the functions described in connection with a block(s) of each flowchart. Since the computer program instructions may be stored in a computer-available or computer-readable memory that may be oriented to a computer or other programmable data processing devices to implement a function in a specified manner, the instructions stored in the computer-available or computer-readable memory may produce a product including an instruction for performing the functions described in connection with a block(s) in each flowchart. Since the computer program instructions may be equipped in a computer or other programmable data processing devices, instructions that generate a process executed by a computer as a series of operational steps are performed by the computer or other programmable data processing devices and operate the computer or other programmable data processing devices may provide steps for executing the functions described in connection with a block(s) in each flowchart.

Each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term unit is not limited as meaning a software or hardware element. A unit may be configured in a storage medium that may be addressed or may be configured to reproduce one or more processors. Accordingly, as an example, a unit includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a unit may be combined with additional elements or may be split into sub elements or sub units. Further, an element or a unit may be implemented to reproduce one or more CPUs in a device or a security multimedia card. According to embodiments of the disclosure, a unit may include one or more processors.

As used herein, the term "terminal" or "device" may also be referred to as a mobile station (MS), user equipment (UE), user terminal (UT), terminal, wireless terminal, access terminal (AT), subscriber unit, subscriber station (SS), wireless device, wireless communication device, wireless transmit/receive unit (WTRU), mobile node, or mobile or may be referred to in other terms. Various embodiments of the terminal may include cellular phones, smart phones with wireless communication capabilities, personal digital assistants (PDAs) with wireless communication capabilities, wireless modems, portable computers with wireless communication capabilities, capturing/recording/shooting/filming devices, such as digital cameras, having wireless communication capabilities, game players with wireless communications capabilities, music storage and playback home appliances with wireless communications capabilities, Internet home appliances capable of wireless Internet access and browsing, or portable units or terminals incorporating combinations of those capabilities. Further, the terminal may include an M2M terminal and an MTC terminal/device, but is not limited thereto. In the disclosure, the terminal may be referred to as an electronic device or simply as a device.

Hereinafter, the operational principle of the disclosure is described below with reference to the accompanying drawings. When determined to make the subject matter of the present disclosure unclear, the detailed of the known functions or configurations may be skipped. The terms as used herein are defined considering the functions in the present disclosure and may be replaced with other terms according to the intention or practice of the user or operator. Therefore, the terms should be defined based on the overall disclosure.

Hereinafter, embodiments are described in detail with reference to the accompanying drawings. Further, although a communication system using UWB is described in connection with embodiments, as an example, the embodiments may also apply to other communication systems with similar technical background or features. For example, a communication system using Bluetooth or ZigBee may be included therein. Further, embodiments may be modified in such a range as not to significantly depart from the scope of the present disclosure under the determination by one of ordinary skill in the art and such modifications may be applicable to other communication systems.

In general, wireless sensor network technology is largely divided into a wireless local area network (WLAN) technology and a wireless personal area network (WPAN) technology according to the recognition distance. In this case, WLAN is a technology based on IEEE 802.11 which enables access to the backbone network within a radius of about 100 m. WPAN is a technology based on IEEE 802.15 which includes Bluetooth, ZigBee, and UWB. A wireless network in which such a wireless network technology is implemented may include a plurality of electronic devices.

UWB may refer to a short-range high-rate wireless communication technology using a wide frequency band of several GHz or more, low spectral density, and short pulse width (e.g., 1 nsec to 4 nsec) in a baseband state. UWB may mean a band itself to which UWB communication is applied. UWB may enable secure and accurate ranging between devices. Thus, UWB enables relative position estimation based on the distance between two devices or accurate position estimation of a device based on the distance from fixed devices (whose positions are known).

The terminology used herein is provided for a better understanding of the disclosure, and changes may be made thereto without departing from the technical spirit of the disclosure.

"Application dedicated file (ADF)" may be, e.g., a data structure in an application data structure that may host an application or application specific data.

"Application protocol data unit (APDU)" may be a command and a response used when communicating with the application data structure in the UWB device.

"Application specific data" may be, e.g., a file structure having a root level and an application level including UWB controlee information and UWB session data required for a UWB session.

"Controller" may be a ranging device that defines and controls ranging control messages (RCM) (or control messages).

"Controlee" may be a ranging device using a ranging parameter in the RCM (or control message) received from the controller.

Unlike "static STS," "dynamic scrambled timestamp sequence (STS) mode" may be an operation mode in which the STS is not repeated during a ranging session. In this mode, the STS may be managed by the ranging device, and the ranging session key that generates STS may be managed by a secure component.

"Applet" may be an applet executed on the secure component including UWB parameters and service data. In this disclosure, applet may be an FiRaan FiRa applet defined by the FiRa.

Ranging device, also referred to as a UWB device, may be a device capable of performing UWB ranging. In the disclosure, with the ranging device may be an enhanced ranging device (ERDEV) defined in IEEE 802.15.4z or an FiRaan FiRa device defined by the FiRa.

"UWB-enabled application" may be an application for UWB service. For example, the UWB-enabled application may be an application using a framework API for configuring an out-of-band (OOB) connector, a secure service, and/or a UWB service for a UWB session. In this disclosure, the UWB-enabled application may be abbreviated as an application or a UWB application. UWB-enabled application may be an FiRa-enabled application defined by the FiRa.

"Framework" may be a component that provides access to profiles, individual-UWB configurations and/or notifications. "Framework" may be, e.g., a collection of logical software components including a profile manager, OOB connector, secure service, and/or UWB service. In the disclosure, the framework may be an FiRa framework defined by the FiRa.

OOB is data communication that does not use UWB as an underlying wireless technology.

"OOB connector" may be a software component for establishing an OOB connection (e.g., Bluetooth low energy (BLE) connection) between ranging devices. In the disclosure, the OOB connector may be an FiRa OOB connector defined by the FiRa.

"Profile" may be a previously defined set of UWB and OOB configuration parameters. In the disclosure, the profile may be an FiRa profile defined by the FiRa.

"Profile manager" may be a software component that implements a profile available on the ranging device. In the disclosure, the profile manager may be an FiRa profile manager defined by the FiRa.

"Service" may be an implementation of a use case that provides a service to an end-user.

"Smart ranging device" may be a ranging device that may implement an optional framework API. In the disclosure, the smart ranging device may be an FiRa smart device defined by the FiRa.

"Global dedicated file (GDF)" may be a root level of application specific data including data required to establish a USB session.

"Framework API" may be an API used by a UWB-enabled application to communicate with the framework.

"Initiator" may be a ranging device that initiates a ranging exchange.

"Object identifier (OID)" may be an identifier of the ADF in the application data structure.

"Out-of-band (OOB)" may be data communication that does not use UWB as an underlying wireless technology.

"Ranging data set (RDS)" may be data (e.g., UWB session key, session ID, etc.) required to establish a UWB session when it is needed to protect confidentiality, authenticity and integrity.

"Responder" may be a ranging device that responds to the Initiator in a ranging exchange.

"STS" may be a ciphered sequence for increasing the integrity and accuracy of ranging measurement timestamps. The STS may be generated from the ranging session key.

"Secure channel" may be a data channel that prevents overhearing and tampering.

"Secure component" may be an entity (e.g., a secure element or a trusted execution environment (TEE)) having a defined security level that interfaces with UWBS for the purpose of providing RDS to UWBS, e.g., when dynamic STS is used.

"Secure element (SE)" may be a tamper-resistant secure hardware component that may be used as a secure component in the ranging device.

"Secure ranging" may be ranging based on STS generated through a strong encryption operation.

"Secure service" may be a software component for interfacing with a secure component, such as a secure element or a TEE.

"Service applet" may be an applet on a secure component that handles service specific transactions.

"Service data" may be data defined by a service provider that needs to be transferred between two ranging devices to implement a service.

"Service provider" may be an entity that defines and provides hardware and software required to provide a specific service to an end-user.

"Static STS mode" is an operation mode in which STS is repeated during a session, and does not need to be managed by the secure component.

"Secure UWB service (SUS) applet" may be an applet on the SE that communicates with the applet to retrieve data needed to enable secure UWB sessions with other ranging devices. The SUS applet may transfer corresponding data (information) to the UWBS.

"UWB service" may be a software component that provides access to the UWBS.

"UWB session" may be a period from when the controller and the controlee start communication through UWB until the communication stops. A UWB session may include ranging, data transfer, or both ranging and data transfer.

"UWB session ID" may be an ID (e.g., a 32-bit integer) that identifies the UWB session, shared between the controller and the controller.

"UWB session key" may be a key used to protect the UWB Session. The UWB session key may be used to generate the STS. In this disclosure, the UWB session key may be a UWB ranging session key (URSK), and may be abbreviated as a session key.

"UWB subsystem (UWBS)" may be a hardware component implementing the UWB PHY and MAC specifications. UWBS may have an interface to the framework and an interface to the secure component to search for RDS. In this disclosure, the UWB physical layer (PHY) and media access control (MAC) specifications may be, e.g., FiRa PHY and FiRa MAC specifications defined by FiRa referring to IEEE 802.15.4/4z.

When determined to make the subject matter of the present invention unclear, the detailed description of the known art or functions may be skipped.

FIG. 1 illustrates an example architecture of a UWB device.

The UWB device (electronic device) 10 of FIG. 1 may be a ranging device supporting UWB ranging (e.g., UWB secure ranging). The ranging device may be an ERDEV defined in IEEE 802.15.4z or an FiRa device defined by the FiRa.

In the embodiment of FIG. 1, the UWB device 10 may interact with other UWB devices through a UWB session.

The UWB device 10 may implement a first interface (interface #1) that is an interface between the UWB-enabled application 100 and the framework 110, and the first interface allows the UWB-enabled application 100 on the UWB device 10 to use the UWB capabilities of the UWB device 10 in a predetermined manner. In an embodiment, the first interface may be a framework API or a proprietary interface, but is not limited thereto.

The UWB device 10 may implement a second interface (interface #2) that is an interface between the framework 110 and the UWB subsystem (UWBS, 120). The second interface may be a UWB command interface (UCI) or the proprietary interface, but is not limited thereto.

Referring to FIG. 1, the UWB device 10 may include a UWB-enabled application 100, a framework 110, and/or a UWBS 120 including a UWB MAC layer and a UWB physical layer. Depending on the embodiment, some entities may not be included in the UWB device, or additional entities (e.g., security layer) may be further included.

The UWB-enabled application 100 may trigger establishment of a UWB session by UWBS through the first interface. The UWB-enabled application 100 may use one of previously defined profiles. For example, the UWB-enabled application 100 may use one of the profiles defined in the FiRa or a custom profile. The UWB-enabled application 100 may use the first interface to handle related events, such as service discovery, ranging notifications, and/or error conditions.

The UWB framework 110 may provide access to profiles, individual-UWB configurations and/or notifications. The UWB framework 110 may be a set of software components. As described above, the UWB-enabled application 100 may interface with the UWB framework 110 through the first interface, and the UWB framework 110 may interface with the UWBS 120 through the second interface.

Software components of the UWB framework 110 may include, e.g., a profile manager, an OOB connector, secure service, and/or UWB service. The profile manager may serve to manage profiles available on the UWB device. The profile may be a set of parameters required to establish communication between UWB devices. For example, a profile may include a parameter indicating which OOB secure channel is used, a UWB/OOB configuration parameter, a parameter indicating whether the use of a particular security component is mandatory, and/or a parameter related to the file structure of the ADF. The OOB connector may play a role to establish OOB connection between UWB devices. The OOB connector may handle an OOB connection step including a discovery step and a connection step. The OOB connection step is described below with reference to FIG. 4. The secure service may play a role of interfacing with a secure component, such as an SE or TEE. The UWB Service may perform a role of managing UWBS. The UWB Service may provide access to UWBS from the profile manager by implementing the second interface.

The UWBS 120 may be a hardware component including a UWB MAC layer and a UWB physical layer. The UWBS 120 may perform UWB session management and may communicate with the UWBS of another UWB device. The UWBS 120 may interface with the framework 110 through the second interface and may obtain the RDS from the secure component.

Figure 2:
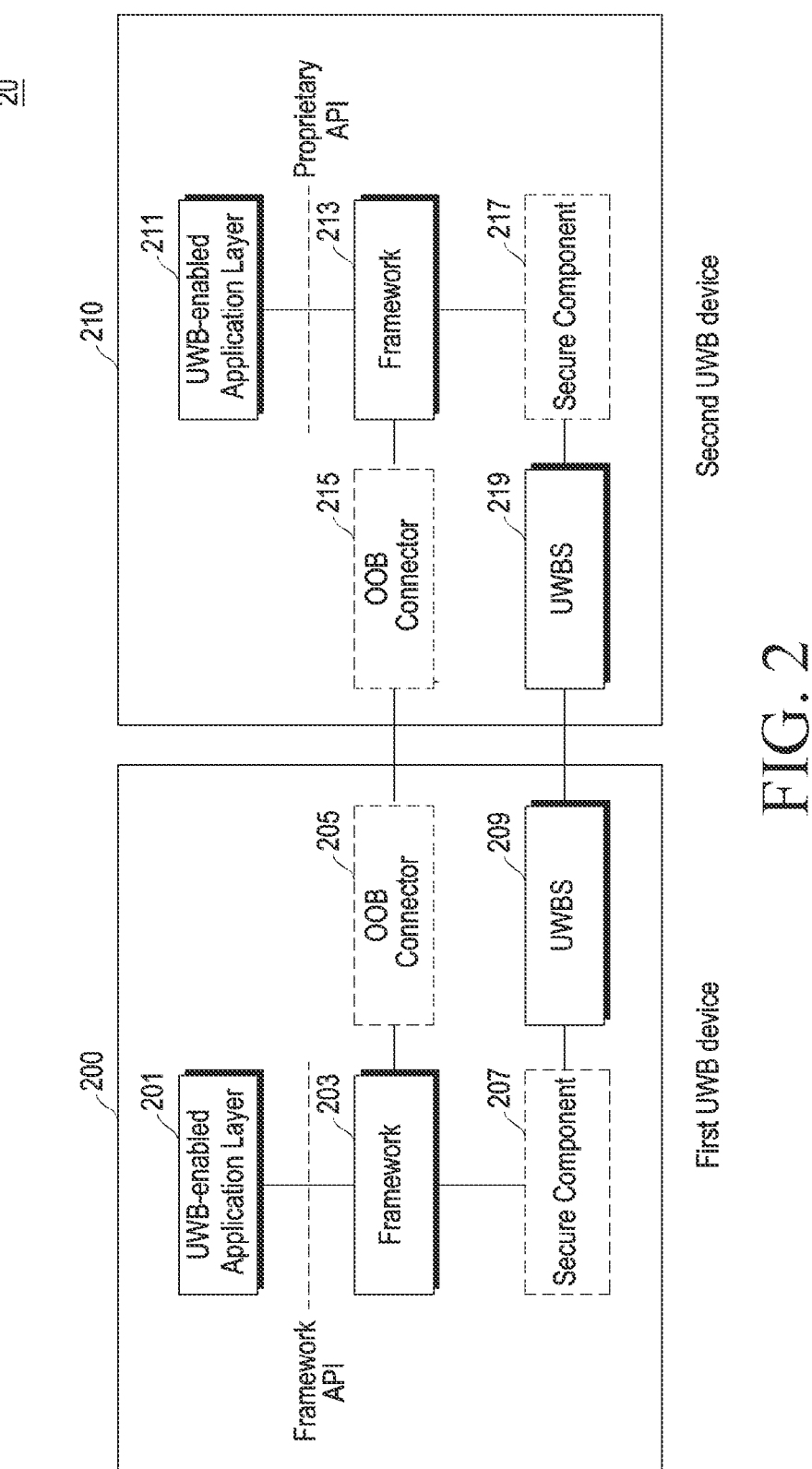
FIG. 2 illustrates a configuration of a communication system including a UWB device.

FIG. 2 illustrates an example configuration of a communication system 20 including a UWB device.

Referring to FIG. 2, the communication system 20 includes a first UWB device 200 and a second UWB device 210. In an embodiment, the first UWB device 200 and the second UWB device 210 may be, e.g., the UWB device 10 of FIG. 1 or an electronic device including the UWB device 10 of FIG. 1.

The first UWB device 200 may host one or more UWB-enabled applications, which may be installed by the user (e.g., a mobile phone) based on the framework API. The second UWB device 210 does not provide a framework API, and, for example, may use a proprietary interface to implement a specific UWB-enabled application. Both the first UWB device 200 and the second UWB device 210 may be Ranging Devices using the framework API, or both the first UWB device 200 and the second UWB device 210 may be Ranging Devices using the proprietary interface.

The first UWB device 200 includes a UWB-enabled application layer 201, a framework 203, an OOB connector 205, a secure component 207 and/or a UWBS 209. The OOB connector 205 and/or the secure component 207 may be optional components and, according to an embodiment, may not be included in the first UWB device 200.

The second UWB device 210 includes a UWB-enabled application layer 211, a framework 213, an OOB connector 215, a secure component 217, and/or a UWBS 219. The OOB connector 215 and/or the secure component 217 may be optional components and, according to an embodiment, may not be included in the second UWB device 210.

The frameworks 203 and 213 may serve to provide access to profiles, individual-UWB configurations, and/or notifications. The frameworks 203 and 213 may be a set of software components, and may include, e.g., profile manager, OOB connector, secure service, and/or UWB service.

The OOB connectors 205 and 215 may be hardware components including a MAC layer and/or a physical layer for OOB communication (e.g., BLE communication). The OOB connectors 205 and 215 may communicate with OOB components of other devices. The first UWB device 200 and the second UWB device 210 create an OOB connection (channel) using the OOB connectors 205 and 215 and exchange parameters for establishing a UWB session through the OOB channel. The OOB connectors 205 and 215 may be referred to as OOB subsystems.

The UWBS 209 and 219 are hardware components including a UWB MAC layer and a UWB physical layer. The UWBS 209 and 219 perform UWB session management and communicate with the UWBS of another UWB device. The first UWB device 200 and the second UWB device 210 may perform transaction of service data and UWB ranging through the UWB session established through the UWBSs 209 and 219 using the exchanged parameters.

The secure components 207 and 217 are hardware components that interface with the framework and/or UWBS to provide RDS.

The UWB-enabled application layers 201 and 211 and/or the frameworks 203 and 213 may be implemented by an application processor (AP) (or processor). Accordingly, it may be understood that the operations of the UWB-enabled application layers 201 and 211 and/or the frameworks 203 and 213 are performed by an AP (or a processor).

Figure 3A:
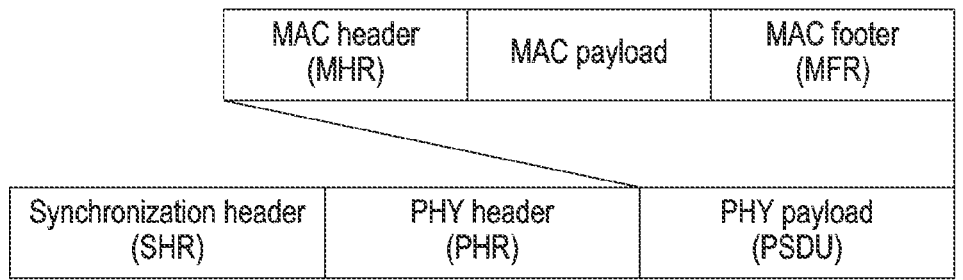
FIGS. 3A and 3B illustrate structures of frames used for UWB communication.
Figure 3B:
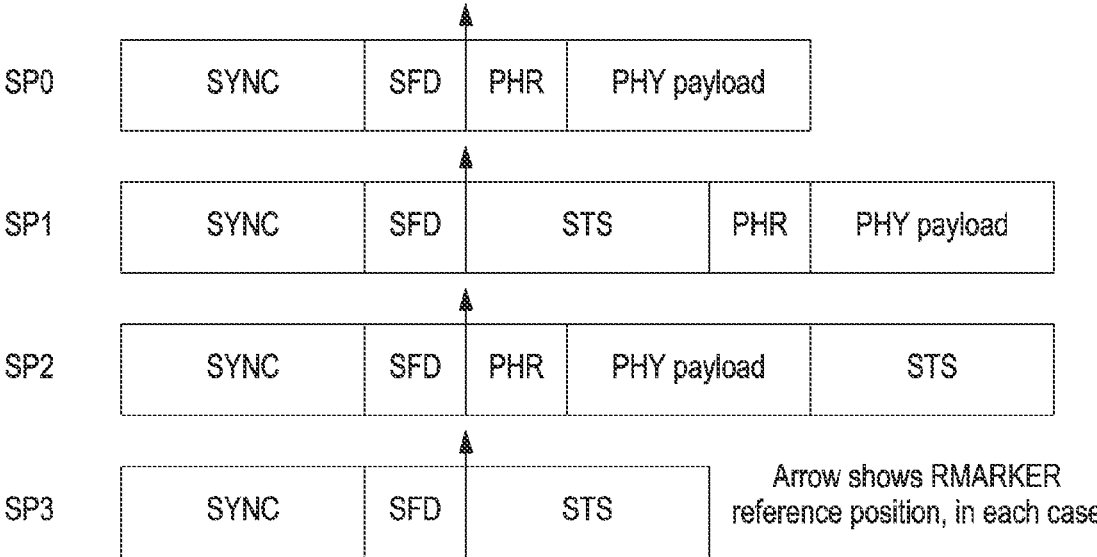

FIGS. 3A and 3B illustrate structures of frames used for UWB communication.

FIG. 3A illustrates an example structure of a frame to which the STS packet configuration is not applied. FIG. 3B illustrates an example structure of a frame to which the STS packet configuration is applied. The frame may be a ranging frame (RFRAME) for transferring ranging data (e.g., ranging start/response/final message, etc.) or a data frame for transferring other data (e.g., service data, etc.).

Referring to FIG. 3A, the frame or a PHY PDU (PPDU) for transferring the frame may include a synchronization header (SHR), a PHY header (PHR), and a PHY payload (PSDU). The PSDU may include a MAC frame. The MAC frame may include a MAC header (MHR), a MAC payload and/or a MAC footer (MFR). The synchronization header of the PPDU may include a SYNC field and a start-of-frame delimiter (SFD). The SFD field may be a field indicating the end of the SHR and the start of the data field. For a description of each element/field included in the PPDU and MAC frame, refer to the description defined in IEEE 802.15.4/4z and/or by the FiRa.

Meanwhile, the PHY layer of the UWB device may include an optional mode to provide a reduced on-air time for high density/low power operation. In this case, the frame may include an encrypted sequence (i.e., STS) to increase the integrity and accuracy of the ranging measurement timestamp. The STS may be used for security ranging.

The structure of the PPDU (or frame) when the STS packet configuration is applied (supported) is shown in FIG. 3B.

Referring to FIG. 3B, in the case of STS packet (SP) configuration 0 (SP0), the STS field is not included in the PPDU (SP0 packet). In the case of SP configuration 1 (SP1), the STS field is positioned immediately after the start of frame delimiter (SFD) field and before the PHR field (SP1 packet). In the case of SP configuration 2 (SP2), the STS field is positioned after the PHY payload (SP2 packet). In the case of SP configuration 3 (SP3), the STS field is positioned immediately after the SFD field, and the PPDU does not include the PHR and data field (PHY payload) (SP3 packet). In other words, in the case of SP3, the frame (or UWB message) does not include the PHR and PHY payload.

SP0, SP1 and SP3 may be configurations that must be supported as mandatory when the STS packet configuration is supported, and SP2 may be an optionally supported configuration.

Figure 4:
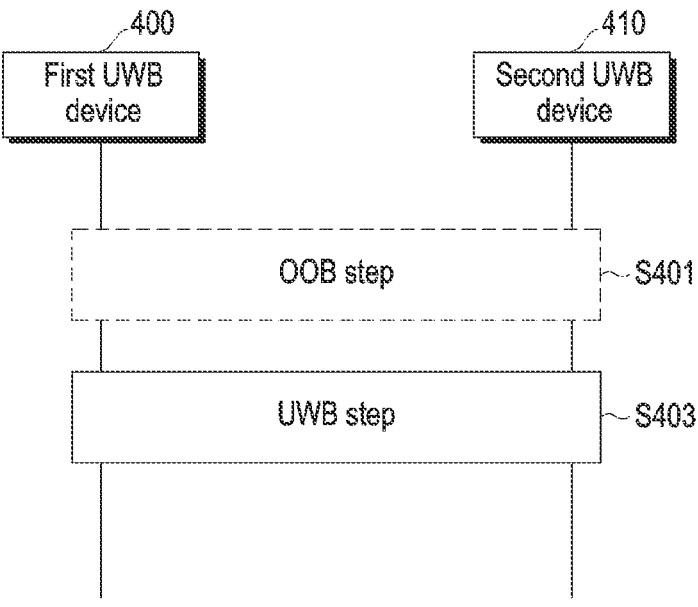
FIG. 4 illustrates a method for performing UWB communication by two UWB devices.

FIG. 4 illustrates a method for performing UWB communication by two UWB devices.

In the embodiment of FIG. 4, a first UWB device 400 plays a role as a controller (or controlee), and a second UWB device 410 plays a role as a controlee (or controller), which is the role opposite to the role of the first UWB device 400. The first UWB device 400 may play a role as an initiator (or responder), and the second UWB device 410 may play a role as a responder (or initiator), which is the role opposite to the role of the first UWB device 400.

Referring to FIG. 4, as a first arrangement, the first UWB device 400 and the second UWB device 410 perform an OOB step before the UWB step (S401), also referred to as an OOB connection step.

The OOB connection step may be performed to discover UWB devices through the OOB channel (e.g., BLE channel), to establish and control a UWB session.

The OOB connection step may include at least one of:
discovering UWB devices and profiles (device and profile discovery)
establishing an OOB connection (channel)
establishing a secure channel to secure messages and data
exchanging parameters for establishing a UWB session through the secure channel (e.g., UWB capability parameters (controlee capability parameters), UWB configuration parameters and/or session key-related parameters) (parameter exchange step)

The parameter exchange step may include the step for the controlee to transfer controlee capability parameters/messages (UWB_CAPABILITY) to the controller, the step for the controller to transfer UWB configuration parameters/messages (UWB_CONFIGURATION) to the controlee, and/or one UWB device to transfer session key-related parameters/messages (SESSION_KEY_INFO) for protecting the UWB session to the other UWB device.

The controlee (UWB) capability parameter and/or session key parameter may be included and transmitted in the controlee information message (CONTROLEE_INFO) which is the OOB message transferred from the controlee to the controller. The UWB configuration parameter and/or session key parameter may be included and transmitted in the session data message (SESSION_DATA) which is the OOB message transferred from the controller to the controlee.

The controlee performance parameter (UWB_CAPABIL-ITY) may include at least one parameter that provides information about the device capability of the controlee. For example, the controller performance parameter may include one or more of a parameter for supporting the role of the device (initiator or responder), a parameter for multi-node support, a parameter for supporting STS configuration, a parameter for supporting a ranging method, an RFRAME feature performance parameter, a parameter for supporting angle-of-arrival (AoA), and/or a parameter for supporting a scheduled mode.

The UWB configuration parameter (UWB_CONFIGU-RATION) may include at least one parameter used for configuration of a UWB session. For example, UWB configuration parameter may include one or more of a UWB session ID parameter, a ranging method parameter, a multi-node configuration parameter, an STS configuration parameter, the scheduled mode parameter, a time-of-flight (ToF) report parameter, an AoA-related parameter, a parameter indicating the number of slots per ranging round, a slot duration parameter, a responder slot index parameter, a MAC address mode parameter, a device MAC address parameter, a parameter indicating the number of controlees, and/or a destination (DST) MAC address parameter.

The session key-related parameter (SESSION_KEY-_INFO) may include a session key-related parameter for Dynamic STS and/or a session key-related parameter for Static STS. For example, the session key-related parameter for dynamic STS may include data exchanged to generate a UWB session key or data directly used as a UWB session key. For example, the Static STS may include an ID (Vendor ID) of a vendor that is a provider of the UWB-enabled application and any pre-defined value (Static STS IV) selected by the UWB-enabled application for the UWB device. The vendor ID may be used to set a phyVupper64 parameter for Static STS, and the Static STS IV may be used to set a vUpper64 parameter.

As another arrangement, the first UWB device 400 and the second UWB device 410 may perform a UWB step (S403, referred to as an UWB connection step.

The UWB connection step is performed for UWB ranging through the UWB session and transfer of service data.

The UWB connection step may include at least one of:

Starting a UWB session (UWB Trigger)

Performing UWB ranging to obtain the distance/position between two UWB devices

Exchanging service data (transaction)

As described above, the OOB connection step is an optional step and may be omitted in some embodiments. For example, when discovery of a UWB device and/or establishment and control of a UWB session are performed through a UWB channel (in-band), the OOB connection step may be omitted. For example, when in-band discovery is performed, the OOB connection step of performing OOB discovery may be omitted. In this case, the UWB step may further perform an operation for discovering a UWB device through the UWB channel and exchanging parameters for UWB session configuration.

Figure 5A:
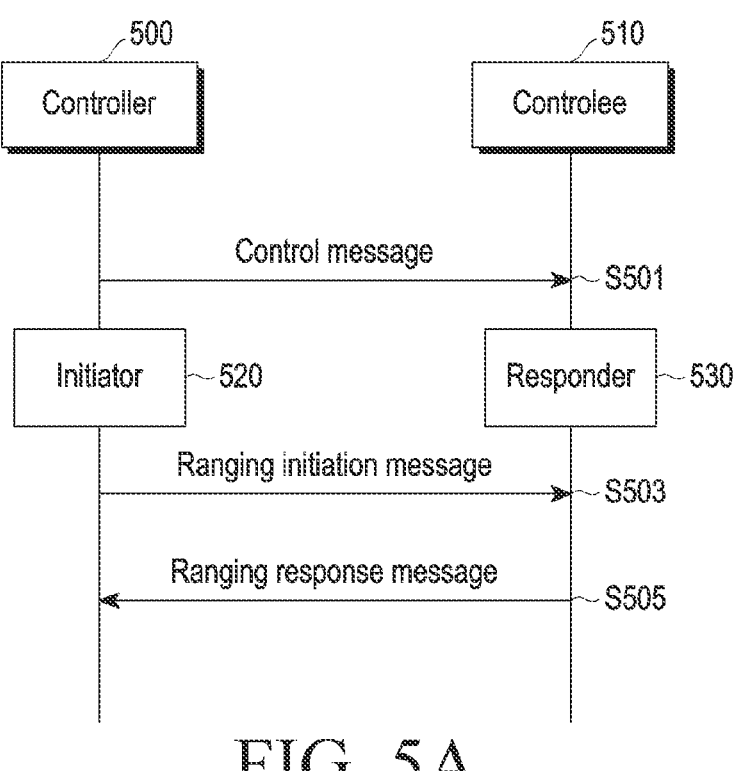
FIGS. 5A and 5B illustrate methods for performing UWB ranging by two UWB devices.
Figure 5B:
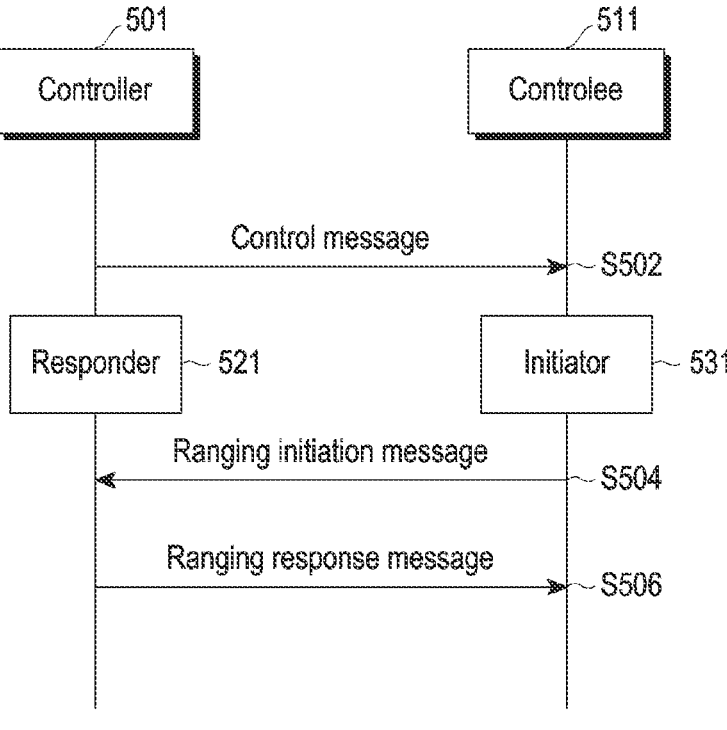

FIGS. 5A and 5B illustrate methods for performing UWB ranging by two UWB devices.

FIG. 5A illustrates the first UWB device operating as the controller 500/initiator 520, and the second UWB device operating as controlee 510/responder 530. FIG. 5B illustrates the first UWB device operating as the controller 501/responder 521, and the second UWB device operating as the controlee 511/initiator 531.

Referring to FIGS. 5A and 5B, the controllers 500 and 501 transmit a control message for UWB ranging to the controlee 510 and 511 (S501 and S502). The ranging control message may be used to carry ranging parameter(s) for controlling and configuring a ranging procedure. In an embodiment, the control message may include information about the role (e.g., initiator or responder) of the ranging device, ranging slot index information, and/or address information about the ranging device.

The initiators 520 and 531 transmit a ranging initiation message for initiating UWB ranging to the responders 530 and 521 (S503 and S504). The initiators 520 and 531 may transmit a ranging initiation message through an SP1 packet or an SP3 packet. When the ranging initiation message is transmitted through the SP1 packet, the control message may be included and transmitted in the PHY payload of the ranging initiation message. When the ranging initiation message is transmitted through the SP3 packet, the ranging initiation message does not include the PHR and PHY payloads.

The responders 530 and 521 may transmit a ranging response message to the initiators 520 and 531 in response to the ranging initiation message (S505 and S506). The responders 530 and 521 may transmit the ranging response message through an SP1 packet or an SP3 packet. When the ranging response message is transmitted through the SP1 packet, a first measurement report message may be included and transmitted in the PHY payload of the ranging response message. The first measurement report message may include an AoA measurement, a reply time measured by the responder and/or a list of round-trip time measurements for responders and responder addresses. The reply time field may indicate a time difference between the reception time of the ranging initiation message and the transmission time of the ranging response message at the responder side. Based on this, single-sided two-way ranging (SS-TWR) may be performed. ToF calculation through SS-TWR follows the scheme defined in IEEE 802.15.4z or the FiRa.

In the case of double-sided two-way ranging (DS-TWR), the initiators 520 and 531 further transmit a ranging final message to the responders 530 and 521 to complete the ranging exchange. When the ranging final message is transmitted through the SP1 packet, a second measurement report message may be included and transmitted in the PHY payload of the ranging final message. The second measurement report message may include an AoA measurement, the round-trip time for the first responder (first round-trip time) and/or a list of reply time measurements for responders and responder addresses. When the sender of the measurement report message is the initiator, the first round-trip time field may indicate a time difference between the ranging initiation message from the initiator and the first ranging response message from the first responder. Alternatively, when the sender of the measurement report message is the responder, the first round-trip time field may indicate a time difference between the ranging response message from the responder and the ranging final message from the initiator. Based on this, DS-TWR may be performed. ToF calculation through DS-TWR follows the scheme defined in IEEE 802.15.4z or the FiRa.

The above-described first measurement report message and/or second measurement report message may not be included in the ranging response message and/or the ranging final message but may be transmitted as separate messages. For example, when a non-deferred mode is applied, the measurement report message may be transmitted through the data frame after the ranging exchange.

The initiators 520 and 531 and the responders 530 and 521 may perform UWB ranging according to a predetermined schedule mode. For example, in a time-scheduled ranging mode, the controller may know the IDs of all controlees and may designate an accurate schedule of ranging transmission. As another example, in a contention-based ranging mode, the controller does not know the number and ID of the controlees, and thus UWB devices compete with each other. In this case, a collision may occur between the responding devices.

Figure 6:
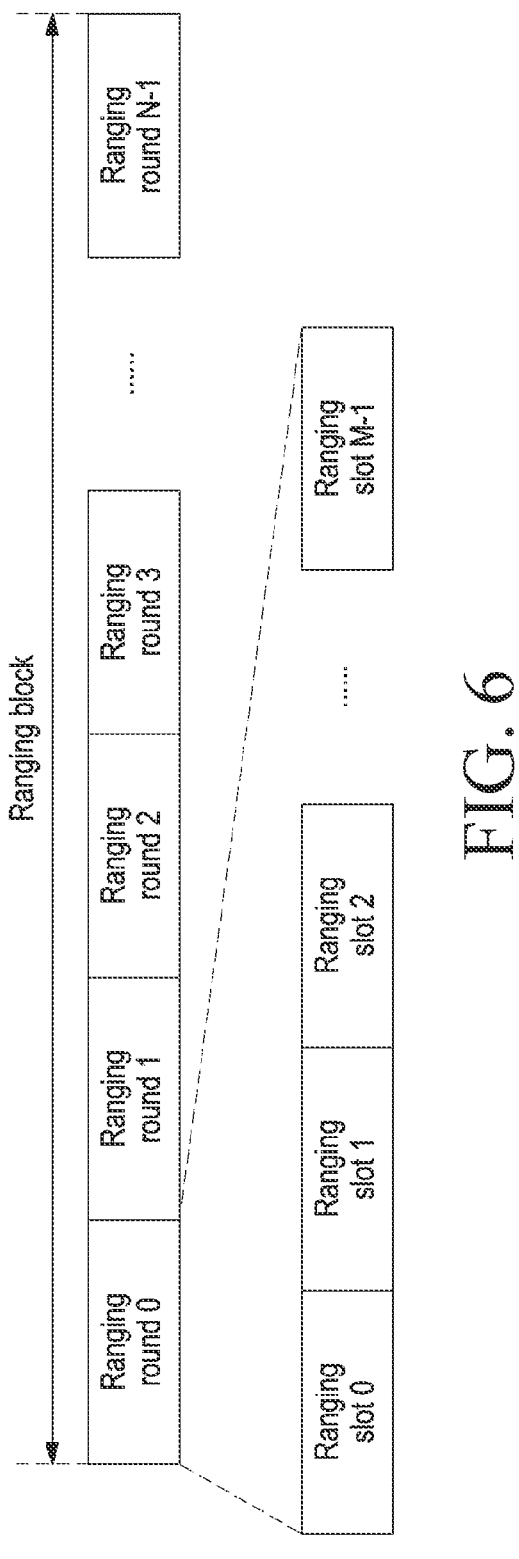
FIG. 6 illustrates a structure of a ranging block and a round used for UWB ranging.

FIG. 6 illustrates a structure of a ranging block and a round used for UWB ranging.

In this disclosure, the ranging block refers to a time period for ranging. The ranging round may be a period of sufficient duration to complete one entire range-measurement cycle in which a set of UWB devices participating in a ranging exchange involves. The ranging slot may be a sufficient period for transmission of at least one RFRAME (e.g., ranging start/response/final message, etc.).

As shown in FIG. 6, one ranging block may include at least one ranging round. Each ranging round may include at least one ranging slot.

When the ranging mode is a block-based mode, a mean time between contiguous ranging rounds may be a constant. Alternatively, when the ranging mode is an interval-based mode, the time between contiguous ranging rounds may be dynamically changed. In other words, the interval-based mode may adopt a time structure having an adaptive spacing.

The number and duration of slots included in the ranging round may be changed between ranging rounds, and may be configured through a control message from the controller.

Figure 7:
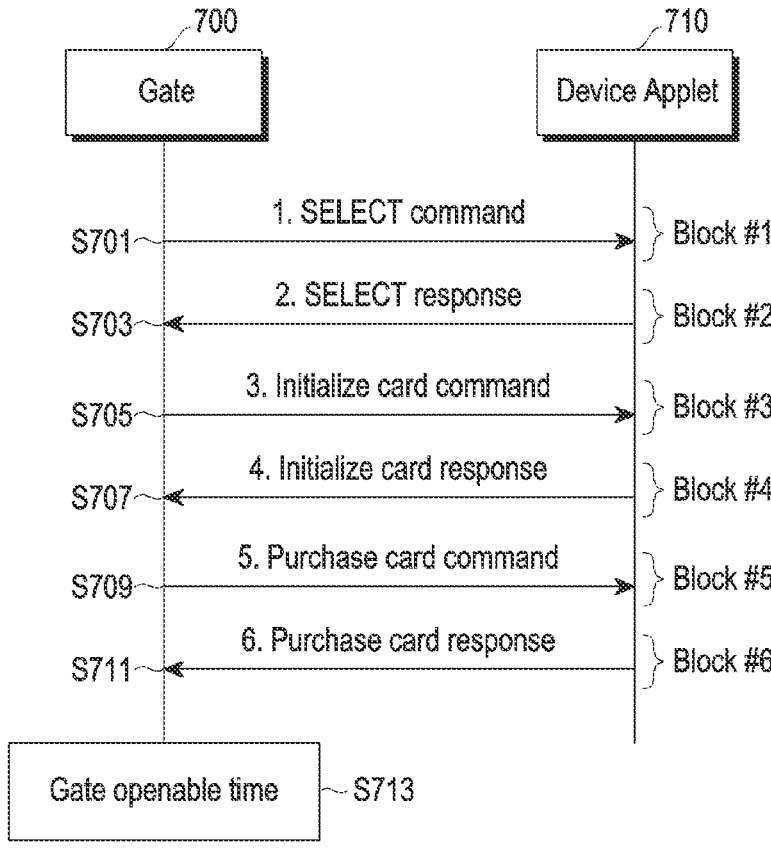
FIG. 7 illustrates a payment process through UWB between a gate and a device applet.

FIG. 7 illustrates a payment process through UWB between a gate and a device applet.

Each of the UWB devices including the gate 700 and device applet 710, as shown in FIG. 7, may correspond to the first UWB device 200 and 400 or the second UWB device 210 and 410 shown in FIGS. 2 and 4. Each of the UWB devices including the gate 700 and the device applet 710 of FIG. 7 may correspond to the controller 500 and 501 or the controlee 510 and 511 shown in FIGS. 5A and 5B.

In FIG. 7, the gate 700 may perform a payment process through UWB communication with the UWB device, and opening/closing of the gate is controlled to allow the UWB device to pass the gate if the payment is complete. The device applet 710 may be an applet that is included in the UWB device and is executed on the secure component including UWB parameters and service data. The device applet 710 may be an FiRa applet defined by the FiRa.

Each of the gate 700 and the device applet 710 may communicate by occupying a specific ranging round of each ranging block. Given that the processing time required for APDU exchange between the gate 700 and the device applet 710 is 70 ms or more, only one APDU may be transmitted per ranging block. The APDU may operate in command-response pair.

Referring to FIG. 7, upon payment processing through UWB communication, at least 6 APDU exchanges are required between the gate 700 and the device applet 710. Accordingly, at least 6 ranging blocks are required. The gate 700 may transmit a SELECT command message to the device applet 710 in the first ranging block (Block #1) (S701) and receive a SELECT response message from the device applet 710 in the second ranging block (Block #2) (S703).

The gate 700 may transmit an initialize card command message to the device applet 710 in the third ranging block (Block #3) (S705) and receive an initialize card response message from the device applet 710 in the fourth ranging block (Block #4) (S707).

The gate 700 may transmit a purchase card command message to the device applet 710 in the fifth ranging block (Block #5) (S709) and receive a purchase card response message from the device applet 710 in the sixth ranging block (Block #6) (S711). The gate 700 may open the gate after completing payment processing with the device applet 710 (S713).

For example, if 288 ms is required for each ranging block in each of operations S701 to S711, a total of 1728 ms may be required for payment processing through UWB in operations S701 to S711. However, to enhance the utility of the payment processing application through UWB, a need arises to reduce the total processing time.

Accordingly, the present disclosure provides, in a time constrained system, such as a UWB-based gate system, a method for shortening the protocol operation time by minimizing APDU exchange, via a two-step security key operation.

Key 1) Issuance of a long term key for a secure connection with the gate when registering the service of the terminal; and Key 2) Issuance of a short term eTicket on demand from the service provider (e.g., transportation operator) when entering a gate or station.

After pre-authentication of the gate using the long term key, the terminal submits a short term eTicket to the gate only when the gate authentication is successful, thereby informing the gate of the terminal's ability to pay. The short term eTicket may be provided by the service provider or service operator during the preparation phase.

To minimize data exchange at the APDU level in the protocol, prior data necessary before the first APDU exchange may be exchanged in advance between devices in the UWB channel creation step.

The payment process through UWB disclosed herein may include a preparation process, an eTicket issuance process, and a transaction process. Hereinafter, each process of preparation, payment information (eTicket) issuance, and transaction is described with reference to FIGS. 8 to 10.

Figure 8:
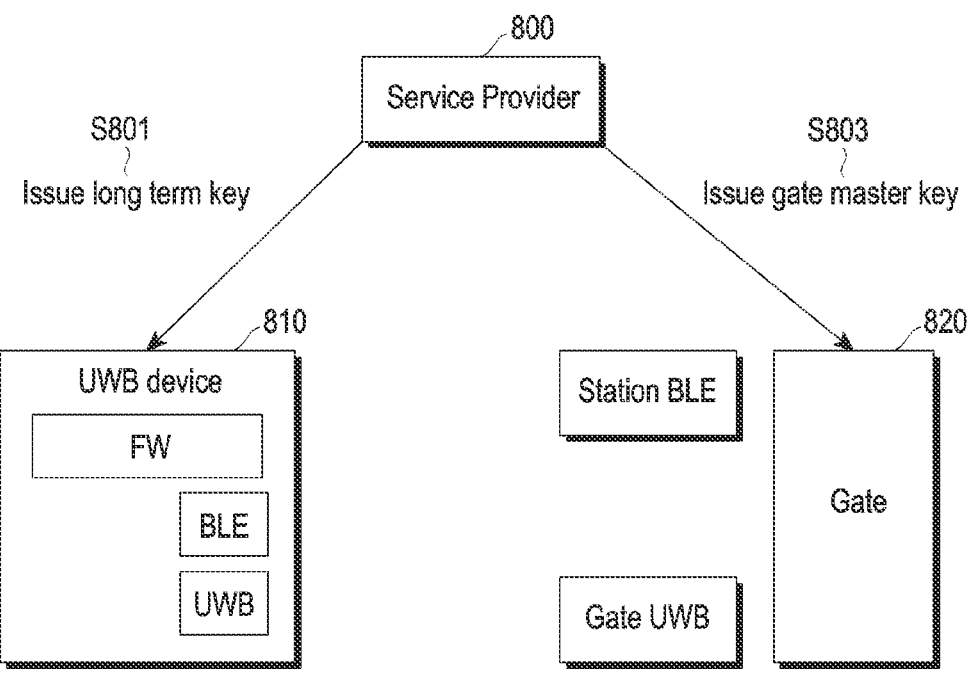
FIG. 8 illustrates a preparation process for payment through UWB between a gate and a device according to an embodiment.
Figure 9:
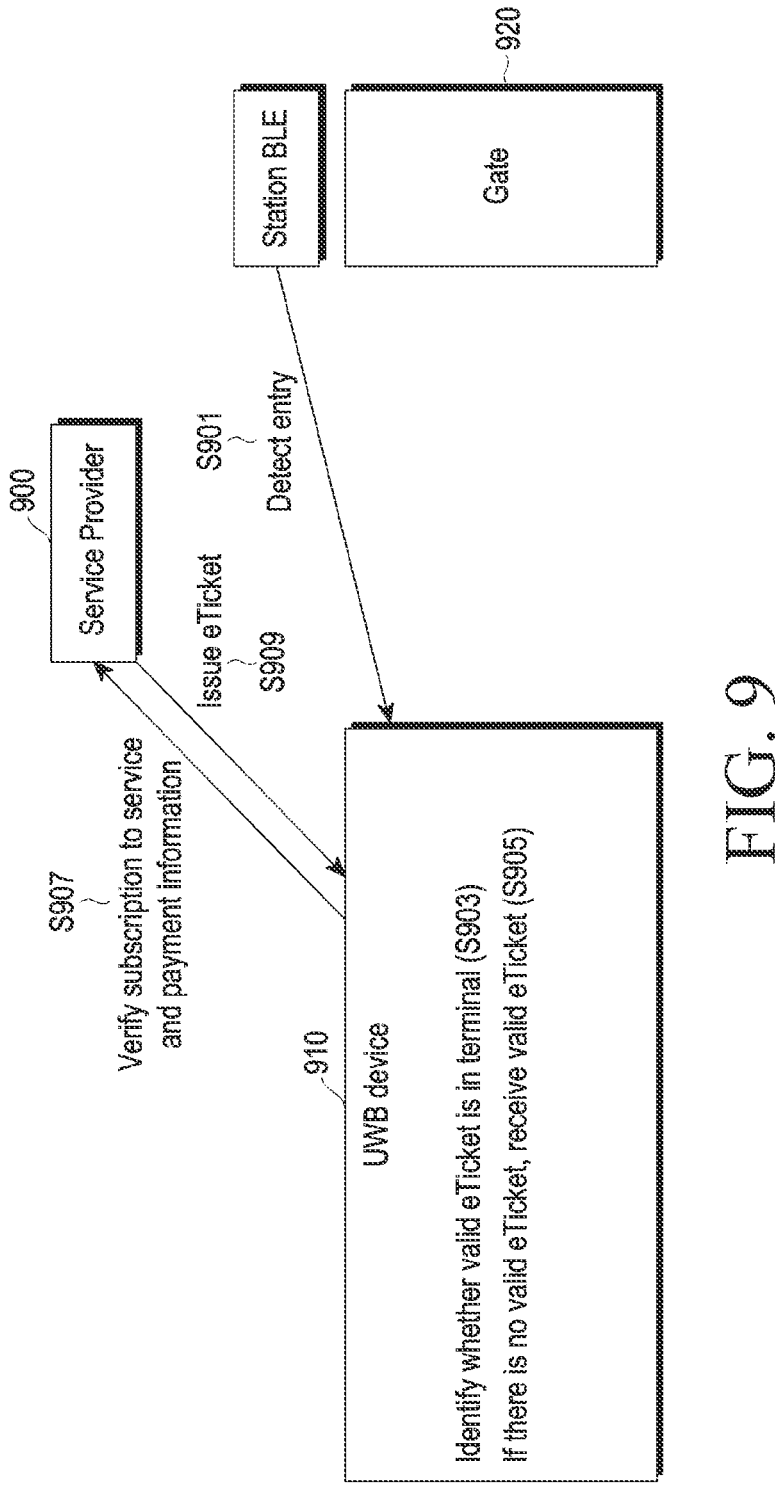
FIG. 9 illustrates an eTicket issuance process for payment through UWB between a gate and a device according to an embodiment.
Figure 10:
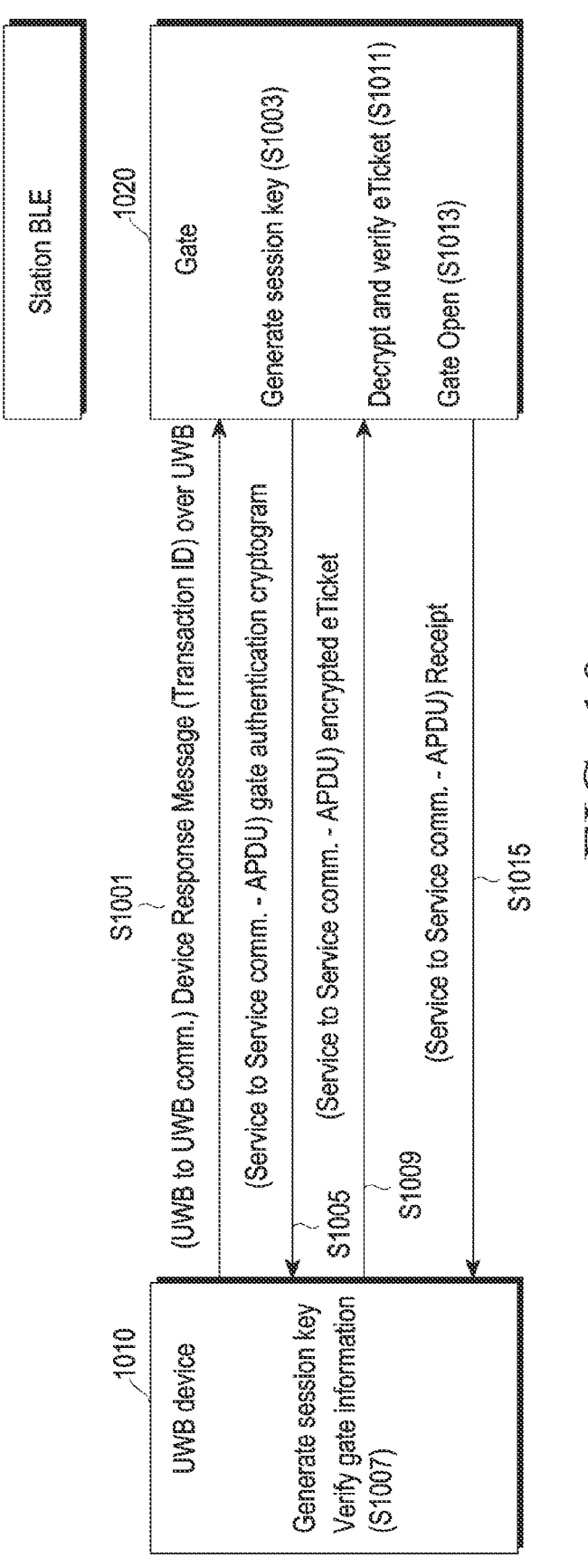
FIG. 10 illustrates a transaction process for payment through UWB between a gate and a device according to an embodiment.

Each of the UWB devices 810, 910, and 1010 and the gates 820, 920, and 1020 of FIGS. 8 to 10 may correspond to the first UWB device 200 and 400 or the second UWB device 210 and 410 shown in FIGS. 2 and 4. Each of the UWB devices 810, 910, and 1010 and the gates 820, 920, and 1020 of FIGS. 8 to 10 may correspond to the controller 500 and 501 or controlee 510 and 511 shown in FIGS. 5A and 5B. The UWB devices 810, 910, and 1010 of FIGS. 8 to 10 may include a framework, a BLE component, and a UWB component, and a station BLE component and a gate UWB may be installed (or included) on the gates 820, 920 and 1020.

FIG. 8 illustrates a preparation process for payment through UWB between a gate and a device according to an embodiment.

The preparation process may be performed when the UWB device 810 installs an application for performing a payment process in a UWB-based gate system or when an account interacts after the application is installed.

Referring to FIG. 8, the service provider 800 may issue a long term key to the UWB device 810 (S801) and may issue a gate master key to the gate 820 (S803). The long term key and the gate master key may be used for authentication between the UWB device 810 and the gate 820, respectively. The UWB device 810 may proceed with the UWB payment process only when authentication of the gate 820 based on the long term key is successful. The long term key and the gate master key of FIG. 8 are further described with reference to FIG. 13.

FIG. 9 illustrates an eTicket issuance process for payment through UWB between a gate and a device according to an embodiment.

Referring to FIG. 9, the station BLE installed on the gate 920 may perform BLE advertising and, based on BLE advertising, detect entry of the UWB device 910 into the gate (or station) (S901). Thereafter, the UWB device 910 may identify whether there is a valid payment method (eTicket) in the device (S903). Here, the eTicket represents an example of a payment information, though embodiments of the disclosure may be implemented using a payment other than the eTicket.

If it is identified that there is no valid eTicket, the UWB device 910 may perform a procedure for issuing a valid eTicket (S905).

The framework implemented in the UWB device 910 may receive a valid eTicket directly or through an application. The UWB device 910 may request the service provider 900 to verify whether to subscribe to the service and the validity of payment information registered in the service (S907). For example, the service provider 900 may identify the account of the UWB device 910 according to a request to verify whether to subscribe to the service and may verify the card validity of the UWB device 910 to thereby verify the validity of the registered payment information.

When the service subscription of the UWB device 910 and the registered payment information are verified by the service provider 900, the UWB device 910 may receive the payment information (eTicket) generated (or determined) based on the registered payment information from the service provider 900 (S909).

FIG. 10 illustrates a transaction process for payment through UWB between a gate and a device according to an embodiment.

Referring to FIG. 10, the UWB device 1010 may generate a nonce transaction ID for communication with the gate 1020. The UWB device 1010 may monitor the distance from the gate 1020 and perform UWB initiation at the time when payment is needed or approach to the gate 1020. The transaction ID is an ID for identifying a specific transaction.

In the process of UWB connection creation, the UWB device 1010 may transmit a device ID (idEP) and transaction ID to the gate 1020 through UWB to UWB communication (S1001). The UWB device 1010 may include the device ID (idEP) and transaction ID in a message (e.g., Device Response Message) for transmission to the gate 1020 in the process of requesting a slot for UWB communication and receiving an allocation thereof.

Figure 12:
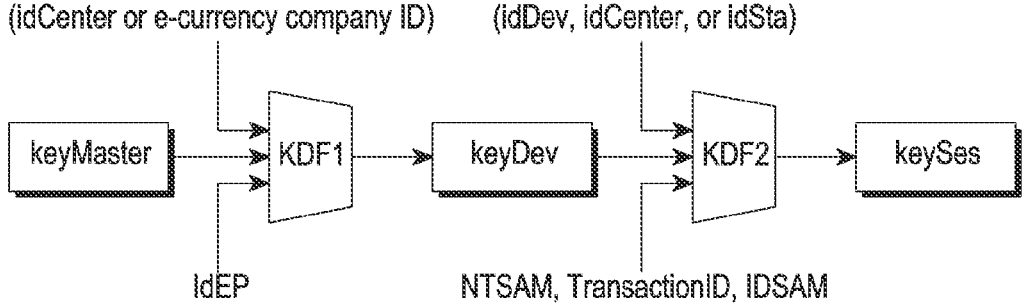
FIG. 12 illustrates a process of obtaining a session key from a master key according to an embodiment.

The gate 1020 may generate a session key (KeyMaster finally generates a session key (KeySes), as explained in FIG. 12) (S1003) using the device ID (idEP) and transaction ID received in operation S1001 and the information possessed by the gate 1020.

The gate 1020 may transmit, to the UWB device 1010, an APDU including at least one of the gate authentication cryptogram, gate identifier (IDSAM), and a transaction counter (NTSAM) through service to service communication (S1005).

IDSAM is the ID of the security authentication module of the gate 1020 and may be denoted as a gate identifier or gate authentication module ID. NTSAM is the counter value possessed by the gate 1020 (since it is increased by 1 whenever a transaction is performed, a new value is used for each transaction (i.e., variable value)).

The UWB device 1010 may generate a session key using the information received and the transaction ID and the device ID (idEP) (intermediate key (KeyDev) finally generates KeySes) to thereby verify information about the gate 1020 (S1007).

The UWB device 1010 may transmit an APDU including the encrypted eTicket, to the gate 1020 through service to service communication (S1009). The gate 1020 may decrypt and verify the encrypted eTicket (S1011) and, if verification is complete, open the gate (S1013). Thereafter, the gate 1020 may transmit an APDU including receipt information regarding the payment to the UWB device 1010 through service to service communication (S1015). A method for opening the gate through three message exchanges of operations S1001, S1005, and S1009 between the UWB device 1010 and the gate 1020 is shown in FIG. 10.

Since in FIG. 7, the gate is open through six message exchanges of operations S701 to S711 between the UWB device and the gate, it is possible to shorten the protocol operation time by minimizing the APDU exchange through the method of FIG. 10.

In FIG. 10, as the UWB device 1010 (transaction ID, device ID) required to create a session is transferred in the UWB connection creation step, the gate 1020 may first create a session key, so that additional APDU exchange may be reduced. In the disclosure, the gate is pre-authenticated with the long term key, and the eTicket is transferred, so that the authentication information supposed to be exchanged between the UWB device and the gate and the steps may be minimized.

Figure 11:
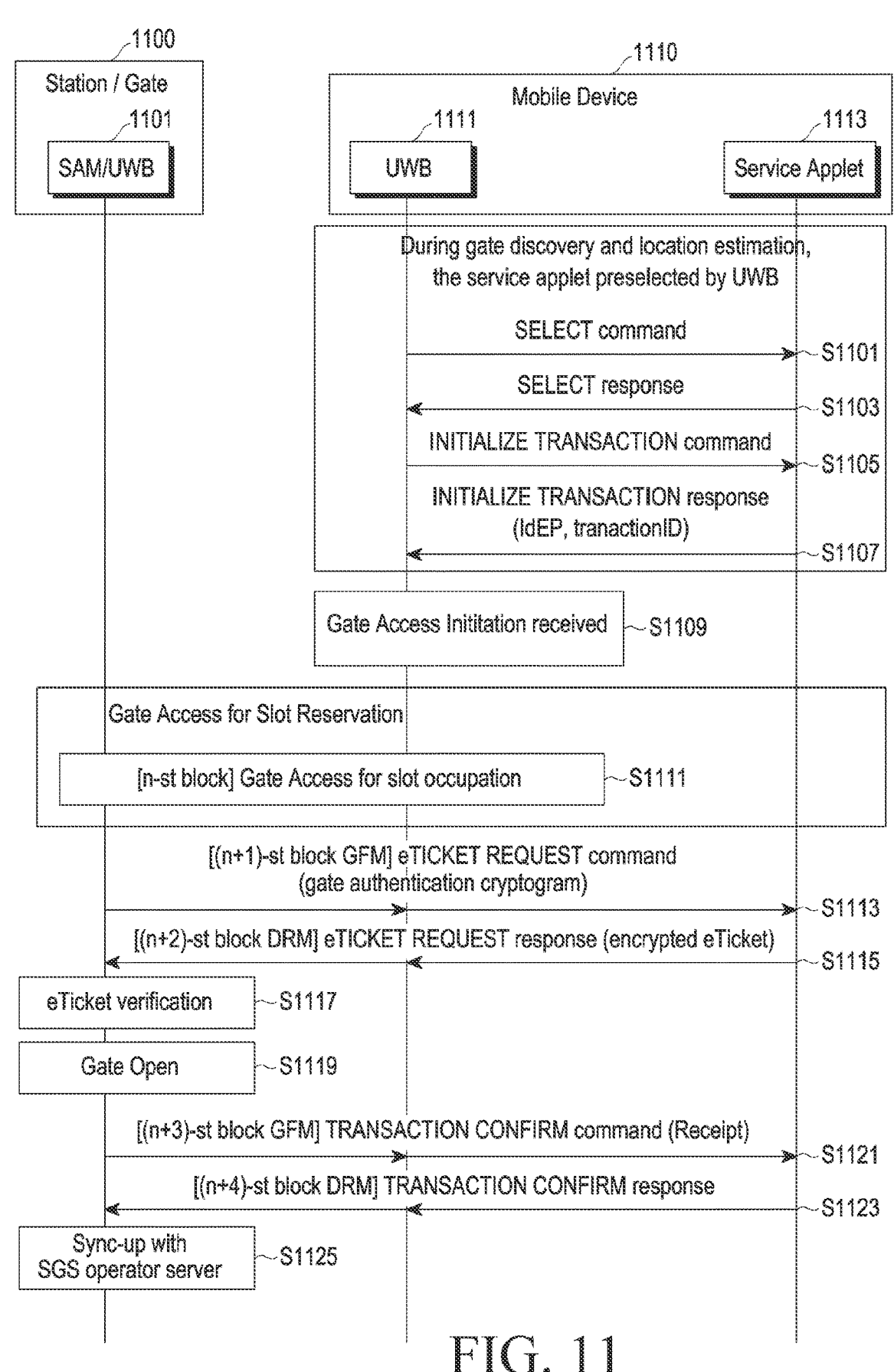
FIG. 11 illustrates a payment process through UWB between a gate and a device according to an embodiment.

FIG. 11 illustrates a payment process through UWB between a gate and a device according to an embodiment.

Referring to FIG. 11, a station/gate 1100 may include a SAM/UWB processing unit 1101, and a UWB device (mobile device) 1110 may include a UWB processing unit 1111 and a service applet 1113.

Each of the UWB devices 1110 and the station/gate 1100 of FIG. 11 may correspond to the first UWB device 200 and 400 or the second UWB device 210 and 410 shown in FIGS. 2 and 4. Each of the UWB device 1110 and the station/gate 1100 of FIG. 11 may correspond to the controller 500 and 501 or the controlee 510 and 511 shown in FIGS. 5A and 5B.

Referring to operations S1101 to S1117, regarding gate discovery and location estimation, the service applet 1113 may be pre-selected by the UWB processing unit 1111. The UWB processing unit 1111 may transmit a SELECT command message to the service applet 1113 (S1101) and receive a SELECT response message from the service applet 1113 (S1103). The UWB processing unit 1111 may transmit an INITIALIZE TRANSACTION command message for initiating a transaction to the service applet 1113 (S1105) and may receive an INITIALIZE TRANSACTION response message from the service applet 1113 (S1113). The INITIALIZE TRANSACTION response message may include a device ID (idEP) and a transaction ID.

The UWB processing unit 1111 may receive a gate access initiation request (S1109). The UWB processing unit 1111 may perform gate access for slot reservation or slot occupation in the nth block (S1111). The SAM/UWB processing unit 1101 may transmit an eTICKET REQUEST command message including a gate authentication cryptogram to the UWB processing unit 1111 in the n+1th block (S1113). The eTICKET REQUEST command message including the gate authentication cryptogram may be transferred to the service applet 1113 (S1113).

The service applet 1113 may transmit an eTICKET REQUEST response message including the encrypted eTICKET to the UWB processing unit 1111 in the n+2nd block (S1115). The eTICKET REQUEST response message including the encrypted eTICKET may be transferred to the SAM/UWB processing unit 1101 (S1115).

The SAM/UWB processing unit 1101 may decrypt and verify the encrypted eTICKET (S1117) and, if the verification is complete, control the gate to be opened (S1119).

The SAM/UWB processing unit 1101 may transmit a TRANSACTION CONFIRM command message including payment-related receipt information (Receipt) to the UWB processing unit 1111 in the n+3rd block (S1121). The TRANSACTION CONFIRM command message including the receipt information (Receipt) may be transferred to the service applet 1113 (S1121).

The service applet 1113 may transmit a TRANSACTION CONFIRM response message to the UWB processing unit 1111 in the n+4th block (S1123). The TRANSACTION CONFIRM response message may be transferred to the SAM/UWB processing unit 1101 (S1123). Thereafter, the SAM/UWB processing unit 1101 may perform a synchronization process with the operator server (e.g., an SGS operator server) (S1125).

Figure 13:
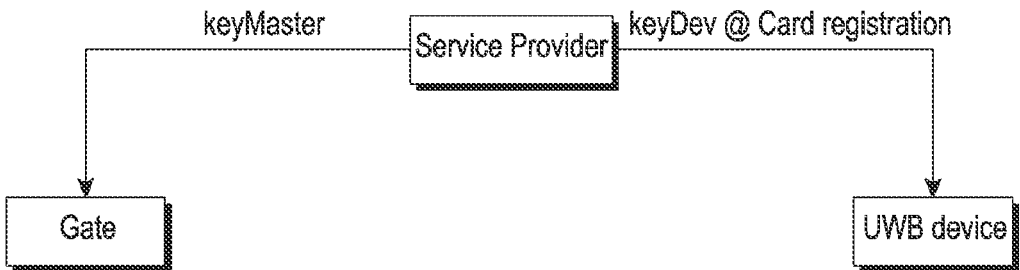
FIG. 13 illustrates a process of issuing a key by another service provider according to an embodiment.

FIG. 12 illustrates a process of obtaining a session key from a master key according to an embodiment. FIG. 13 illustrates a process of issuing a key by another service provider according to an embodiment.

Referring to FIG. 12, the UWB device or gate may (1) derive an intermediate key (keyDev) from a master key (keyMaster) and (2) derive a session key (keySes) from the intermediate key (keyDev).

FIG. 12 illustrates deriving the intermediate key (keyDev) from the master key (keyMaster).

As shown in FIG. 12, the intermediate key (keyDev), which is the output value, is derived through a first function KDF1 using at least one of the master key (keyMaster), the device ID (idEP) and the ID of the ID center (e.g., an electronic currency company), as an input.

The master key (keyMaster) is stored in the SAM of the gate system. The intermediate key (keyDev) is a unique key of the UWB device provided by the service operator or service provider during the preparation phase. The intermediate key (keyDev) may also be referred to as a long term key.

FIG. 12 also illustrates deriving the session key (keySes) from the intermediate key (keyDev).

As also shown in FIG. 12, the session key (keySes), which is the output value, is derived through a second function KDF2 using at least one of the intermediate key (keyDev), IDSAM, NTSAM, transaction ID, device ID, station ID, and ID of the ID center, as an input.

A plurality of session keys (KeySesEnc, KeySesMac) may be generated to be used separately for their uses. The plurality of session keys (KeySesEnc, KeySesMac) may be generated to be used only in a corresponding transaction according to information exchanged between the gate and the UWB device. The KeySesEnc is the derived symmetric key used to encrypt confidential data.

The long term key issued by the service provider in operation S801 of FIG. 8 may be the intermediate key (keyDev) of FIG. 12, and the gate master key issued by the service provider in operation S803 may be the master key (keyMaster) of FIG. 12.

Referring to FIG. 13, the service provider may provide the master key (keyMaster), as the gate master key, to the gate. The service provider may provide the intermediate key (keyDev), as the long term key, to the UWB device. According to an embodiment, the intermediate key (keyDev) may be registered and used in a card used for payment in the UWB device.

Figure 14A:
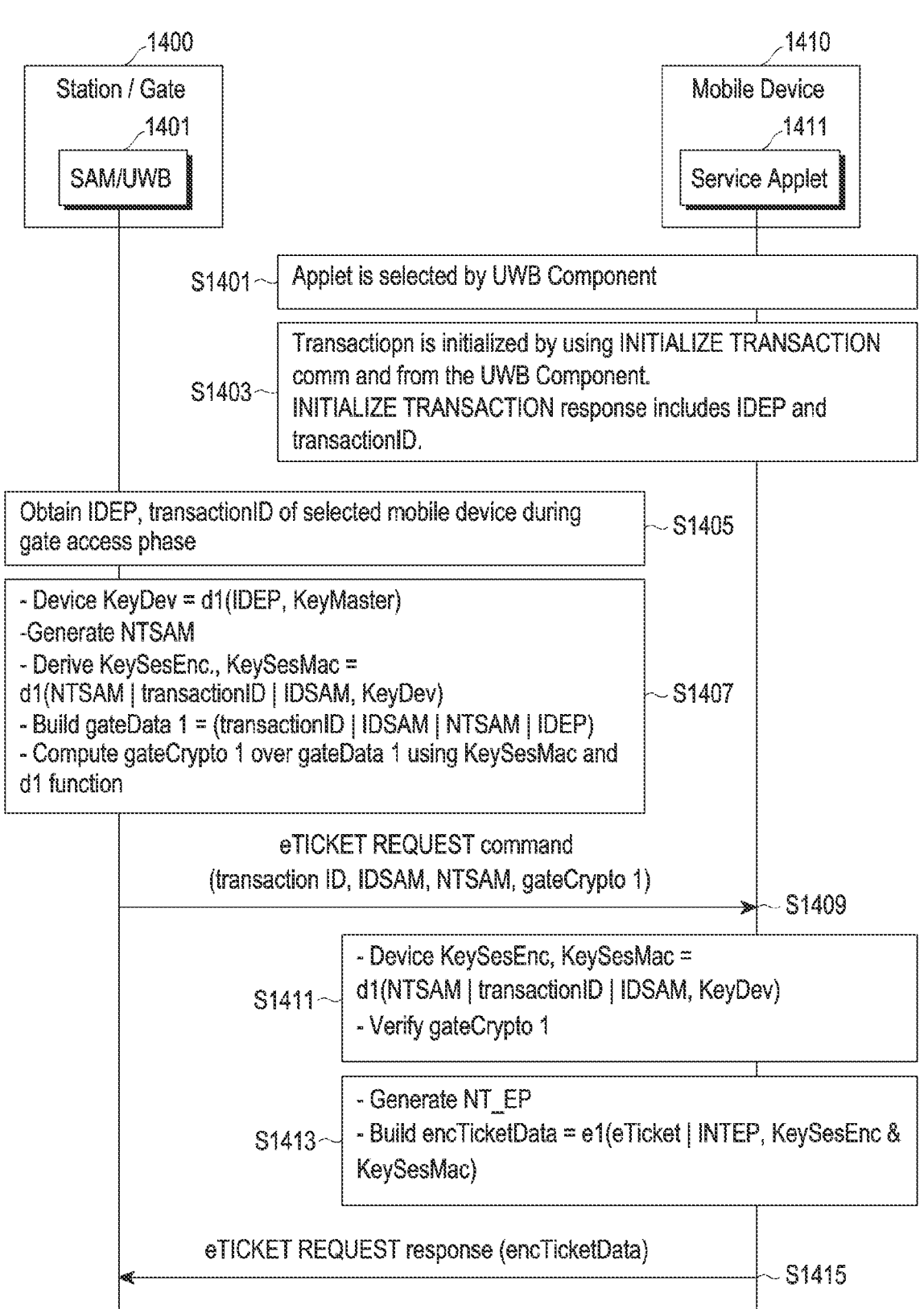
FIGS. 14A and 14B illustrate a payment process through UWB between a gate and a device according to an embodiment.
Figure 14B:
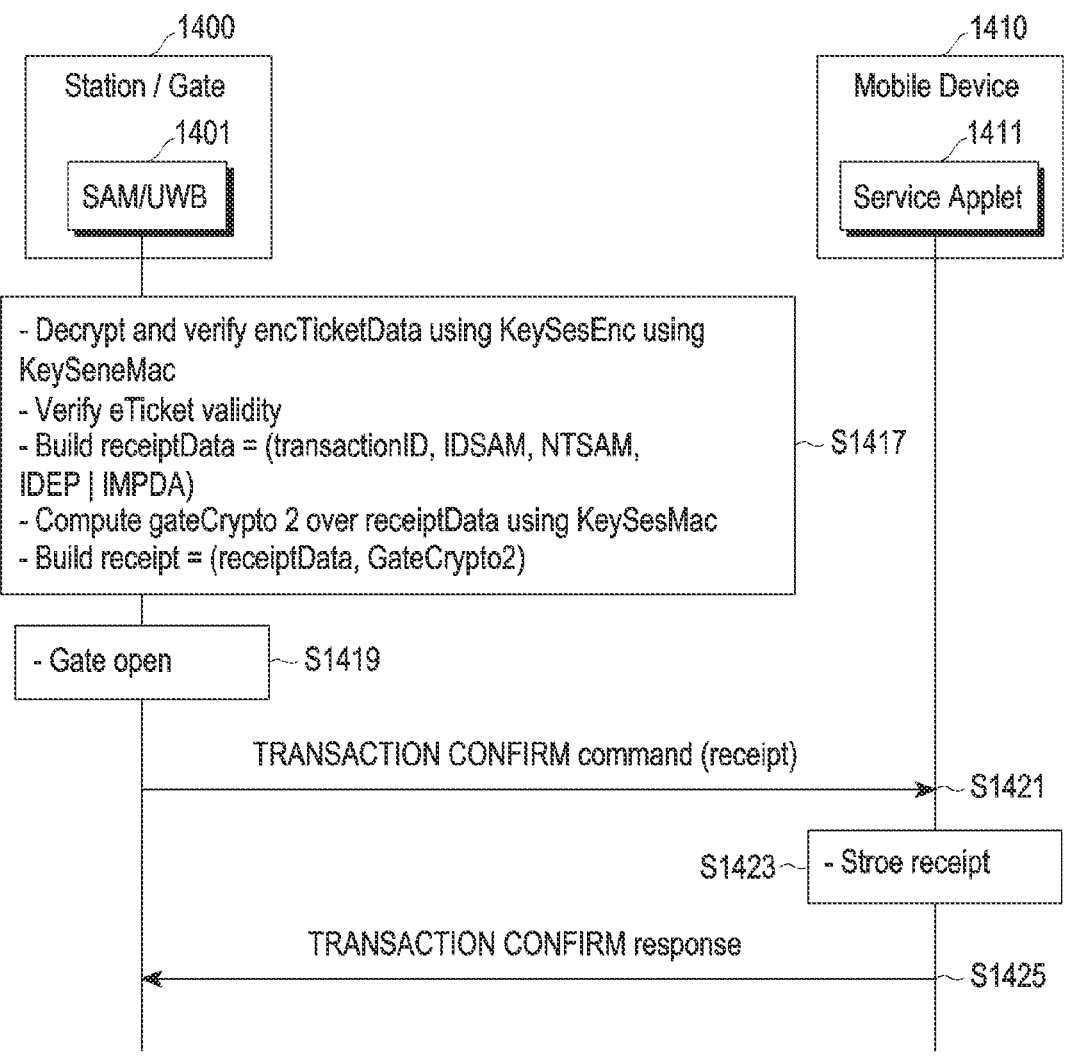

FIGS. 14A and 14B illustrate a payment process through UWB between a gate and a device according to an embodiment.

Referring to FIGS. 14A and 14B, a station/gate 1400 may include a SAM/UWB processing unit 1401, and a UWB device (mobile device) 1410 may include a service applet 1411.

Each of the UWB devices 1410 and the station/gate 1400 of FIG. 14 may correspond to the first UWB device 200 and 400 or the second UWB device 210 and 410 shown in FIGS. 2 and 4. Each of the UWB device 1410 and the station/gate 1400 of FIG. 14 may correspond to the controller 500 and 501 or the controlee 510 and 511 shown in FIGS. 5A and 5B.

The service applet 1411 may be selected by the UWB component (S1401). Based on the INITIALIZE TRANSACTION command message received by the service applet 1411 from the UWB component, a transaction may be initiated (S1403). The service applet 1411 may transmit an INITIALIZE TRANSACTION response message including the device ID (idEP) and the transaction ID to the UWB component (S1403).

The SAM/UWB processing unit 1401 may obtain the device ID (idEP) and the transaction ID of the selected UWB device 1410 during a gate access phase (S1405).

The SAM/UWB processing unit 1401 may derive session keys (KeySesEnc, KeySesMac) and may calculate the gate authentication cryptogram (gateCrypto1) (S1407). The SAM/UWB processing unit 1401 may derive the intermediate key (KeyDev) through a function using the master key (KeyMaster) and the device ID (idEP) received from the service provider. The SAM/UWB processing unit 1401 may generate an NTSAM (counter value of the gate, incremented by 1 every time a transaction is performed). The SAM/UWB processing unit 1401 may derive session keys (KeySesEnc, KeySesMac) through a function using the NTSAM, transaction ID, IDSAM (gate identifier), and KeyDev. A plurality of session keys (KeySesEnc, KeySesMac) may be generated to be used separately for their uses, and the plurality of session keys (KeySesEnc, KeySesMac) may be generated to be used only in the corresponding transaction using the information exchanged between the station/gate 1400 and the UWB device 1410.

The SAM/UWB processing unit 1401 may generate gate data (gateData1) through a function using the transaction ID, IDSAM, NTSAM, and device ID (idEP). The SAM/UWB processing unit 1401 may calculate the gate authentication cryptogram (gateCrypto1) through gateData1 using a function and KeySesMac.

The SAM/UWB processing unit 1401 may transmit an eTICKET REQUEST command message including at least one of transaction ID, IDSAM, NTSAM, device ID (idEP), and gateCrypto1 to the service applet 1411 (S1409).

The service applet 1411 may derive session keys (KeySesEnc, KeySesMac) through a function using the NTSAM, transaction ID, IDSAM (gate identifier), and KeyDev (S1411). The service applet 1411 may verify gateCrypto1 to perform gate verification (S1411).

The service applet 1411 may generate an NTEP and may generate encrypted eTicket data (encTicketData) using the eTicket, NTEP, KeySesEnc, and KeySesMac (S1413). The service applet 1411 may transmit an eTICKET REQUEST response message including the encrypted eTicket data (encTicketData) to the SAM/UWB processing unit 1401 (S1415). According to an embodiment, the NTEP is the counter value of the UWB device 1410.

As shown in FIG. 14B, the UWB processing unit 1401 may decrypt and verify the encrypted eTicket data (encTicketData) based on the session keys (KeySesEnc, KeySesMac) (S1417). The SAM/UWB processing unit 1401 may verify the validity of the eTicket. The SAM/UWB processing unit 1401 may generate receipt data (receiptData) based on the transaction ID, IDSAM, NTSAM, device ID (idEP), and payment amount information (MPDA). The MPDA means the fee or freight charged for the transaction. The SAM/ UWB processing unit 1401 may calculate the gate authentication cryptogram (gateCrypto2) through the receiptData using the KeySesMac. The SAM/UWB processing unit 1401 may generate receipt information (receipt) including receipt data (receiptData) and gate authentication cryptogram (gateCrypto2).

The SAM/UWB processing unit 1401 may open the gate for the UWB device 1410 to pass therethrough (S1419). The SAM/UWB processing unit 1401 may transmit a TRANS-ACTION CONFIRM command message including receipt information (receipt) to the service applet 1411 (S1421). The service applet 1411 may store the receipt information (receipt) (S1423) and transmit a TRANSACTION CONFIRM response message to the SAM/UWB processing unit 1401 (S1425).

Figure 15:
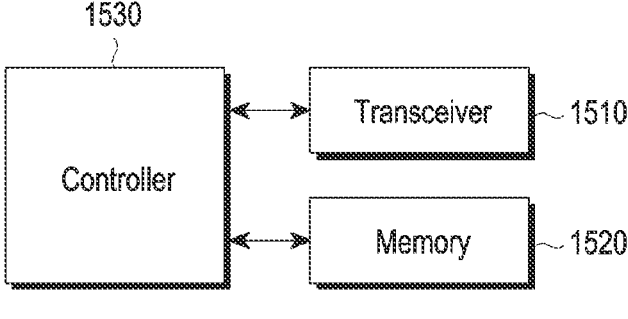
FIG. 15 illustrates a structure of a UWB device according to an embodiment.

FIG. 15 illustrates a structure of a UWB device according to an embodiment.

The UWB device described with reference to FIGS. 1 to 14 may correspond to the UWB device of FIG. 15. Referring to FIG. 15, the proxy device may include a transceiver 1510, a memory 1520, and a controller 1530.

The transceiver 1510, controller 1530, and memory 1520 of the UWB device may be operated according to the above-described UWB device communication method. However, the components of the UWB device are not limited thereto. For example, the UWB device may include more or fewer components than the above-described components. The transceiver 1510, the controller 1530, and the memory 1520 may be implemented in the form of a single chip. The controller 1530 may include one or more processors.

The transceiver 1510 collectively refers to a transmitter of the UWB device and a receiver of the UWB device and may transmit and receive signals to/from another device. To that end, the transceiver 1510 may include a radio frequency (RF) transmitter for frequency-up converting and amplifying signals transmitted and an RF receiver for low-noise amplifying signals received and frequency-down converting the frequency of the received signals. However, this is merely an example of the transceiver 1510, and the components of the transceiver 1510 are not limited to the RF transmitter and the RF receiver.

The transceiver 1510 may receive signals via a radio channel, output the signals to the controller 1530, and transmit signals output from the controller 1530 via a radio channel.

The memory 1520 may store programs and data necessary for the operation of the UWB device. The memory 1520 may store control information or data that is included in the signal obtained by the UWB device. The memory 1520 may include a storage medium, such as read only memory (ROM), random access memory (RAM), hard disk, CD-ROM, and digital versatile disc (DVD), or a combination of storage media. Rather than being separately provided, the memory 1520 may be embedded in the controller 1530.

The controller 1530 may control a series of processes for the UWB device to be able to operate according to the above-described embodiments.

The controller 1530 may control the transceiver 1510 to transmit, to a gate, a first message including a device ID for identifying the UWB device and a transaction ID for identifying a transaction of the UWB device, control the transceiver 1510 to receive, from the gate, a second message including a gate authentication cryptogram generated based on the device ID and the transaction ID, verify the gate based on the gate authentication cryptogram, encrypt payment information about the transaction when the gate is verified, and control the transceiver to transmit, to the gate, a third message including the encrypted payment information.

The controller 1530 may control the transceiver 1510 to receive a long term key for verifying the gate from a service provider, obtain at least one session key based on the long term key and the transaction ID, and encrypt the payment information based on the at least one session key and the payment information about the transaction.

The controller 1530 may control the transceiver 1510 to transmit a payment account and card information registered in the UWB device to a service provider and, when the payment account and the card information are verified by the service provider, receive the payment information about the transaction from the service provider.

The controller 1530 may control the transceiver 1510 to receive, from the gate, an APDU including receipt information when payment for the transaction is complete based on the payment information about the transaction.

Figure 16:
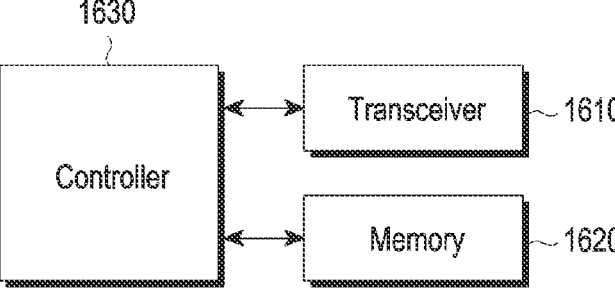
FIG. 16 illustrates a structure of a gate device according to an embodiment.

FIG. 16 illustrates a structure of a gate device according to an embodiment.

The gate/station described with reference to FIGS. 1 to 14 may correspond to the gate device of FIG. 16. Referring to FIG. 16, the gate device may include a transceiver 1610, a memory 1620, and a controller 1630.

The transceiver 1610, controller 1630, and memory 1620 of the gate device may be operated according to the above-described gate device communication method. However, the components of the gate device are not limited thereto. For example, the gate device may include more or fewer components than the above-described components. The transceiver 1610, the controller 1630, and the memory 1620 may be implemented in the form of a single chip. The controller 1630 may include one or more processors.

The transceiver 1610 collectively refers to a transmitter of the gate device and a receiver of the gate device and may transmit and receive signals to/from another device. To that end, the transceiver 1610 may include an RF transmitter for frequency-up converting and amplifying signals transmitted and an RF receiver for low-noise amplifying signals received and frequency-down converting the frequency of the received signals. However, this is merely an example of the transceiver 1610, and the components of the transceiver 1610 are not limited to the RF transmitter and the RF receiver.

The transceiver 1610 may receive signals via a radio channel, output the signals to the controller 1630, and transmit signals output from the controller 1630 via a radio channel.

The memory 1620 may store programs and data necessary for the operation of the gate device. The memory 1620 may store control information or data that is included in the signal obtained by the gate device. The memory 1620 may include a storage medium, such as ROM, RAM, hard disk, CD- ROM, and DVD, or a combination of storage media. Rather than being separately provided, the memory 1620 may be embedded in the controller 1630.

The controller 1630 may control a series of processes for the gate device to be able to operate according to the above-described embodiments.

The controller 1630 may control the transceiver 1610 to receive, from a UWB device, a first message including a device ID for identifying the UWB device and a transaction ID for identifying a transaction of the UWB device, generate a gate authentication cryptogram based on the device ID and the transaction ID, control the transceiver 1610 to transmit a second message including the generated gate authentication cryptogram to the UWB device, and control the transceiver 1610 to receive, from the UWB device, a third message including encrypted payment information about the transaction when a gate is verified by the UWB device based on the gate authentication cryptogram.

The controller 1630 may control the transceiver 1610 to receive a gate master key from a service provider, obtain at least one session key based on the gate master key, the device ID, the transaction ID, an IDSAM for identifying the gate, and an NTSAM value driven by the gate, and generate the gate authentication cryptogram based on the at least one session key.

The controller 1630 may control the transceiver 1610 to transmit, to the UWB device, an APDU including receipt information when payment for the transaction is complete based on the payment information about the transaction.

The methods according to the embodiments descried in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, ROMs, electrically erasable programmable read-only memories (EEPROMs), magnetic disc storage devices, compact-disc ROMs, DVDs, or other types of optical storage devices, or magnetic cassettes. Alternatively, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), WLAN, or storage area network (SAN) or a communication network configured of a combination thereof. The storage device may connect to the device that performs embodiments of the disclosure via an external port. A separate storage device over the communication network may be connected to the device that performs embodiments of the disclosure.

In the above-described specific embodiments, the components included in the disclosure are represented in singular or plural forms depending on specific embodiments proposed. However, the singular or plural forms are selected to be adequate for contexts suggested for ease of description, and the disclosure is not limited to singular or plural components. As used herein, the singular forms "a," "an"

and "the" are intended to include the plural forms as well, unless the context clearly indicates otherwise.

While the disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

What is claimed:

1. A method performed by a first ultra-wide band (UWB) device including a transceiver, a processor, and a memory storing instructions, the method comprising:

receiving, via the transceiver from an entity providing the service, a long term key for authentication between the first UWB device and a gate using an application of the first UWB device;

receiving, via the transceiver from the entity providing the service, a short term ticket indicating a payment availability of the first UWB device based on a first message through a short-range wireless communication, the first message including station information;

transmitting, via the transceiver to a second UWB device in the gate through a UWB communication, a second message including a device identity (ID) of the first UWB device and a transaction ID associated to the first UWB device;

generating, by the processor, a session key through a function using the long term key, the device ID of the first UWB device, and the transaction ID associated to the first UWB device;

receiving, via the transceiver from the second UWB device, a first application protocol data unit (APDU) in a first ranging block, the first APDU including a gate authentication cryptogram;

determining, by the first UWB processor, whether the gate authentication cryptogram is valid by calculating a function using the device ID of the first UWB device, the transaction ID associated to the first UWB device, and the session key;

in response to the gate authentication cryptogram being valid, encrypting, by the first UWB processor, the short term ticket based on the session key; and based on a distance between the first UWB device and the gate, transmitting, to the second UWB device via the transceiver, a request message including the encrypted short term ticket in a second ranging block after the first ranging block, wherein the encrypted short term ticket indicates a payment result for a right to open the gate, and wherein the distance between the first UWB device and the gate is calculated based on transmitting and receiving UWB messages.

2. The method of claim 1, further comprising:

transmitting, to the entity providing the service, a payment account and card information registered in the first UWB device; and in response to the payment account and the card information being verified by the entity providing the service, receiving, from the entity providing the service, the short term ticket for the transaction.

3. The method of claim 1, wherein the first APDU further includes a gate identifier and a transaction counter, and wherein the gate identifier identifies the gate and the transaction counter is driven by the gate.

4. The method of claim 1, further comprising:

receiving, from the second UWB device, a second APDU including receipt information in response to payment for the transaction being complete based on the short term ticket for the transaction.

5. A first ultra-wide band (UWB) device comprising:

a transceiver;

a processor; and a memory storing instructions which, when executed by the processor, cause the first UWB device to:

receive, via the transceiver from an entity providing the service, a long term key for authentication between the first UWB device and a gate using an application of the first UWB device, receive, via the transceiver from the entity providing the service, a short term ticket indicating a payment availability of the first UWB device based on a first message through a short-range wireless communication, the first message including station information;

transmit, via the transceiver to the second UWB device in the gate through a UWB communication, a second message including a device identity (ID) of the first UWB device and a transaction ID associated to the first UWB device, generate, by the processor, a session key through a function using the long term key, the device ID of the first UWB device, and the transaction ID associated to the first UWB device;

receive, via the transceiver from the second UWB device, a first application protocol data unit (APDU) in a first ranging block, the first APDU including a gate authentication cryptogram, determine, by the processor, whether the gate authentication cryptogram is valid by calculating a function using the device ID of the first UWB device, the transaction ID associated to the first UWB device, and the session key, in response to the gate authentication cryptogram being valid, encrypt, by the processor, the short term ticket based on the session key, and based on a distance between the first UWB device and the gate, transmit, to the second UWB device via the transceiver, a request message including the encrypted short term ticket in a second ranging block after the first ranging block, wherein the encrypted short term ticket indicates a payment result for a right to open the gate, and wherein the distance between the first UWB device and the gate is calculated based on transmitting and receiving UWB messages.

6. The first UWB device of claim 5, wherein the first UWB device is further configured to:

transmit, to the entity providing the service, a payment account and card information registered in the UWB device, and in response to the payment account and the card information being verified by the entity providing the service, receive, from the entity providing the service, the short term ticket for the transaction.

7. The first UWB device of claim 5, wherein the first UWB device is further configured to:

receive, from the gate, a second APDU including receipt information in response to payment for the transaction being complete based on the short term ticket for the transaction.

8. A second ultra-wide band (UWB) included in a gate, the second UWB device comprising:

a transceiver;

a processor; and a memory storing instructions which, when executed by the second UWB processor, cause the second UWB device to:

receive, via the transceiver from a entity providing the service, a gate master key used for authentication between a first UWB device and the gate, receive, via the transceiver from a first UWB device, a message including a device ID of the first UWB device and a transaction ID associated to the first UWB device, obtain, by the processor, a session key through a function using the gate master key, the device ID of the first UWB device, and the transaction ID associated to the first UWB device, generate, by the processor, a gate authentication cryptogram based on the device ID of the first UWB device, the transaction ID associated to the first UWB device, and the session key, transmit, via the transceiver to the first UWB device, a first application protocol data unit (APDU) in a first ranging block, the first APDU including the gate authentication cryptogram, based on a distance between the first UWB device and the gate, receive, via the transceiver from the first UWB device, a request message including an encrypted short term ticket in a second ranging block after the first ranging block, the crypted short term ticket indicating a payment result for a right to open the gate, in response to the authentication cryptogram being verified by the first UWB device, and control the gate to open in response to payment for the transaction being complete based on the payment information, wherein the short term ticket indicates a payment result for a right to open the gate and a short term ticket is issued by the entity providing the service to the first UWB device, and wherein the distance between the first UWB device and the gate is calculated based on transmitting and receiving UWB messages.

9. The second UWB device of claim 8, wherein the second UWB device is further configured to:

transmit, to the first UWB device, a second APDU including receipt information in response to payment for the transaction being complete based on the short term ticket for the transaction.

10. A method performed by a second ultra-wide band (UWB) device included in a gate, the second UWB device including a transceiver, a processor, and a memory storing instructions, the method comprising:

receiving, via the transceiver from an entity providing a service, a gate master key used for authentication between a first UWB device and the gate;

receiving, via the transceiver from the first UWB device, a message including a device ID of the first UWB device and a transaction ID associated to the first UWB device;

generating, by the processor, a session key through a function using the gate master key, the device ID of the first UWB device, and the transaction ID associated to the first UWB device;

generating, by the processor, a gate authentication cryptogram based on the device ID of the first UWB device, the transaction ID associated to the first UWB device, the session key;

transmitting, via the transceiver to the first UWB device, a first application protocol data unit (APDU) in a first ranging block, the first APDU including the gate authentication cryptogram;

based on a distance between the first UWB device and the gate, receiving, via the transceiver from the first UWB device, a request message including an encrypted short term ticket in a second ranging block after the first ranging block, in response to the gate authentication cryptogram being verified by the first UWB device; and controlling, by the processor, the gate to open in response to payment for the transaction being complete based on the payment information, wherein the encrypted short term ticket indicates a payment result for a right to open the gate and a short term ticket is issued by the entity providing the service to the first UWB device, and wherein the distance between the first UWB device and the gate is calculated based on transmitting and receiving UWB messages.

11. The method of claim 10, wherein the first APDU further includes a gate identifier and a transaction counter, and wherein the gate identifier identifies the gate and the transaction counter is driven by the gate.

12. The method of claim 10, further comprising:

transmitting, to the first UWB device, a second APDU including receipt information in response to payment for the transaction being complete based on the short term ticket for the transaction.

\* \* \* \* \*